(12) United States Patent
Becker et al.

(10) Patent No.: US 12,734,618 B2
(45) Date of Patent: Sep. 15, 2026

(54) WELDING TECHNIQUE MONITORING SYSTEMS WITH SLOPED WORKPIECE CALIBRATIONS

(71) Applicant: Illinois Tool Works Inc., Glenview, IL (US)

(72) Inventors: William Joshua Becker, Neenah, WI (US); Brett Sheleski, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 292 days.

(21) Appl. No.: 18/508,405

(22) Filed: Nov. 14, 2023

(65) Prior Publication Data

US 2024/0207982 A1 Jun. 27, 2024

Related U.S. Application Data

(60) Provisional application No. 63/435,357, filed on Dec. 27, 2022.

(51) Int. Cl.
*B23K 37/02* (2006.01)
*B23K 31/02* (2006.01)

(52) U.S. Cl.
CPC .......... *B23K 37/0258* (2013.01); *B23K 31/02* (2013.01)

(58) Field of Classification Search
CPC ...... B23K 9/095; B23K 9/0953; B23K 9/126; B23K 9/127; B23K 31/125; B23K 37/0258; B23K 31/02
See application file for complete search history.

(56) References Cited

U.S. PATENT DOCUMENTS

2010/0224610 A1* 9/2010 Wallace .................. B23K 9/06
2011/0117527 A1* 5/2011 Conrardy et al. ..... G09B 19/24
2013/0206741 A1* 8/2013 Pfeifer et al. ........ B23K 9/0956
2014/0166631 A1* 6/2014 Rozmarynowski .... B23K 10/00
2016/0125761 A1* 5/2016 Becker et al. ......... G09B 19/24
2016/0214198 A1* 7/2016 Hsu ...................... B23K 9/0956

OTHER PUBLICATIONS

Zhang et al., Measurement of three-dimensional welding torch orientation for manual arc welding process, IOP Publishing, Measurement of Science and Technology, 25, 2014, 19 pages.

* cited by examiner

*Primary Examiner* — John E Breene
(74) *Attorney, Agent, or Firm* — McAndrews, Held & Malloy, Ltd.

(57) ABSTRACT

Described herein are examples of tool based welding technique monitoring systems with sloped workpiece calibrations. Using two calibration steps (or one fluid calibrating movement), the disclosed system is able to monitor welding technique along a straight welding joint of any slope, be the slope 0/180/360 degrees (i.e., horizontal), 90/270 degrees (i.e., vertical), or any slope in between. The system provides an inexpensive, intuitive, and relatively robust way of tracking an orientation of a welding-type tool in relation to a welding joint and/or workpiece, and providing welding technique feedback based on the relationship.

20 Claims, 10 Drawing Sheets

WELDING TECHNIQUE MONITORING SYSTEMS WITH SLOPED WORKPIECE CALIBRATIONS

CROSS REFERENCE TO RELATED APPLICATIONS

This application claims priority to, and the benefit of, U.S. Provisional Patent Application No. 63/435,357, filed Dec. 27, 2022, entitled "Welding Technique Monitoring Systems with Sloped Workpiece Calibrations," the entire contents of which are hereby incorporated by reference.

TECHNICAL FIELD

The present disclosure generally relates to welding technique monitoring systems, and, more particularly, to welding technique monitoring systems with sloped workpiece calibrations.

BACKGROUND

Welding technique generally refers to the way in which a welding operator positions, moves, and/or manipulates a welding-type tool relative to a workpiece (and/or a welding joint of the workpiece), such as, for example, during a welding-type operation. Good welding technique can positively impact the quality of a weld. Bad welding technique can negatively impact the quality of a weld. However, it can sometimes be difficult for (e.g., less experienced) human operators to accurately judge whether welding technique is good or bad.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to welding technique monitoring systems with sloped workpiece calibrations, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

Figure 1:
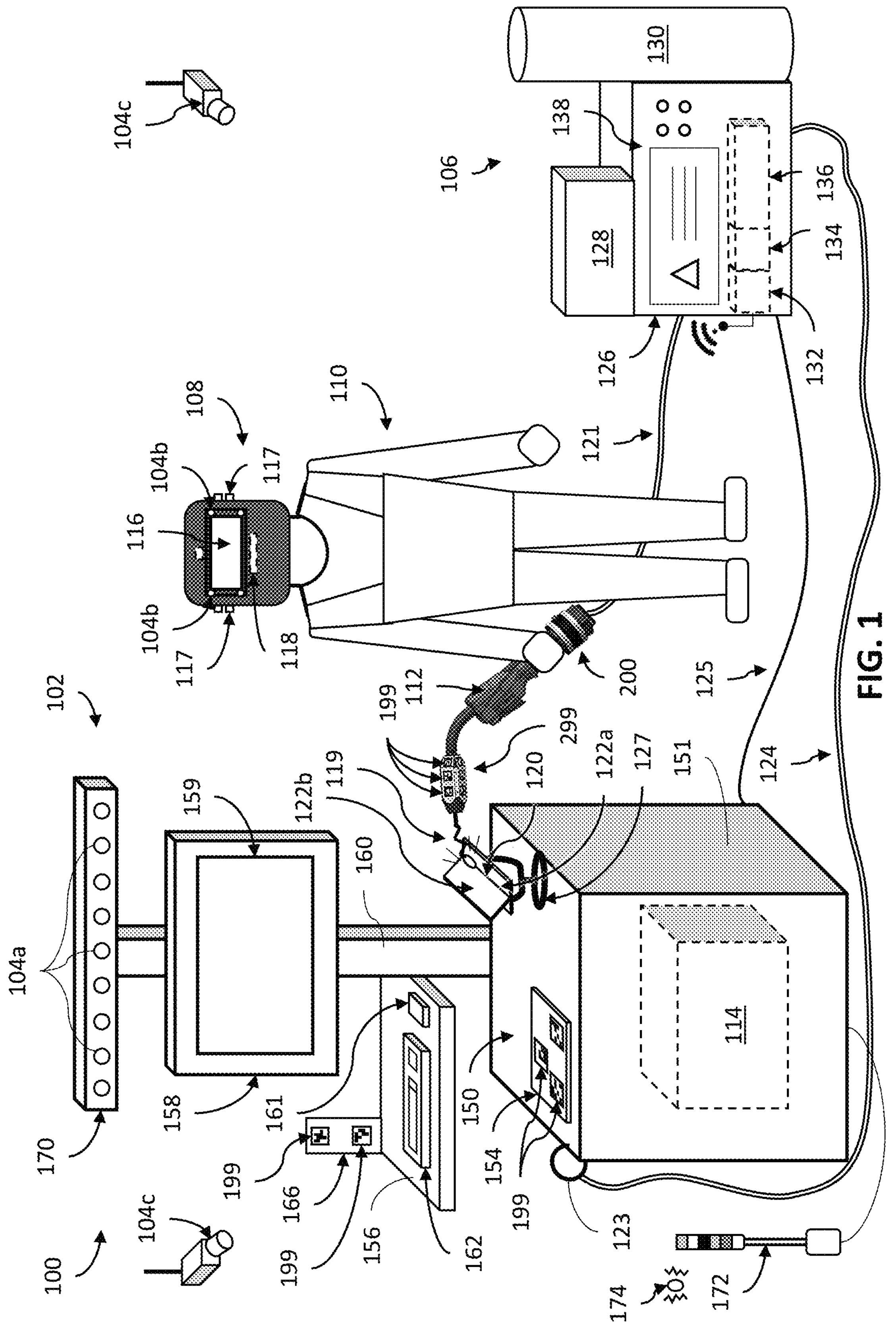
FIG. 1 shows an example of a welding system, in accordance with aspects of this disclosure.

The figures are not necessarily to scale. Where appropriate, the same or similar reference numerals are used in the figures to refer to similar or identical elements. For example, reference numerals utilizing lettering (e.g., workpiece 122*a*, workpiece 122*b*) refer to instances of the same reference numeral that does not have the lettering (e.g., workpieces 122).

DETAILED DESCRIPTION

Some examples of the present disclosure relate to a welding technique monitoring system with sloped workpiece calibrations. Using two calibration steps (or one fluid calibrating movement), the disclosed system is able to monitor welding technique along a straight welding joint of any slope, be the slope 0/180/360 degrees (i.e., horizontal), 90/270 degrees (i.e., vertical), or any slope in between. While some systems may be able to monitor welding technique along a straight welding joint after a single joint calibration step, such systems may rely on the assumption that the welding joint is either horizontal or vertical (as is often the case). Thus, though the system may require two calibration steps (or one fluid calibrating movement), rather than a single calibration step, the system is more robust than other conventional monitoring systems, with a relatively simple, fast, and straightforward calibration process.

Some examples of the present disclosure relate to a method of monitoring welding technique, the method comprising: determining, via processing circuitry, a first joint characteristic vector based on first sensor data detected during a first time period by a sensor system, the first sensor data being representative of a tool orientation of a welding-type tool during the first time period; determining, via processing circuitry, a second joint characteristic vector based on second sensor data detected during a second time period by the sensor system, the second sensor data being representative of the tool orientation of the welding-type tool during the second time period; tracking, during a third time period, via the processing circuitry, the tool orientation of the welding-type tool using third sensor data detected by the sensor system during a third time period; and identifying, via the processing circuitry, a welding technique parameter value based on the tool orientation of the welding-type tool during the third time period and the first and second joint characteristic vectors.

In some examples, the tool orientation of the welding-type tool corresponds to a tool orientation vector, the first or second sensor data comprising data representative of the tool orientation vector. In some examples, the first joint characteristic vector or the second joint characteristic vector comprises a base plate perpendicular vector that is parallel to the tool orientation vector during the first time period or the second time period, respectively, or the first joint characteristic vector or the second joint characteristic vector comprises a joint orientation vector that is parallel to the tool orientation vector during the first time period or the second time period, respectively. In some examples, the first joint characteristic vector comprises a base plate perpendicular vector that is parallel to the tool orientation vector during the first time period, and the second joint characteristic vector comprises a joint orientation vector that is perpendicular to both the tool orientation vector during the second time period and the base plate perpendicular vector, or the first joint characteristic vector comprises a joint orientation vector that is parallel to the tool orientation vector during the first time period, and the second joint characteristic vector comprises a base plate perpendicular vector that is perpendicular to both the tool orientation vector during the second time period and the joint orientation vector.

In some examples, the method further comprises determining a slope of a workpiece or joint, or a travel direction, based on the first joint characteristic vector or the second joint characteristic vector; and providing feedback, via a user interface, based on the travel direction or the slope of the workpiece. In some examples, the sensor system is attached to, or integrated with, the welding-type tool, the tool orientation of the welding-type tool corresponds to a tool orientation vector defined relative to a sensor reference frame of the sensor system, the first or second sensor data is representative of the tool orientation vector or the sensor reference frame, or the sensor system comprises an inertial measurement unit comprising an accelerometer, a gyroscope, or a magnetometer. In some examples, the first and second time periods overlap, the third time period comprises a time period when a welding-type operation occurs, the welding technique parameter value comprises a work angle value or a travel angle value of the welding-type tool, or the method further comprises providing feedback, via a user interface, based on the welding technique parameter value.

Some examples of the present disclosure relate to a method of monitoring welding technique, the method comprising: determining, via processing circuitry, a joint parallel plane, or joint perpendicular vector, based on first sensor data detected during a first time period by a sensor system; determining, via processing circuitry, a first joint characteristic vector and a second joint characteristic vector based on the joint parallel plane, or the joint perpendicular vector, and second sensor data detected during a second time period by the sensor system; tracking, during a third time period, via the processing circuitry, a tool orientation of a welding-type tool using third sensor data detected by the sensor system during a third time period; and identifying, via the processing circuitry, a welding technique parameter value based on the first and second joint characteristic vector and the tool orientation of the welding-type tool.

In some examples, the first joint characteristic vector or the second joint characteristic vector is perpendicular to the joint perpendicular vector, or parallel to at least one vector that lies along the joint parallel plane. In some examples, the tool orientation of the welding-type tool corresponds to a tool orientation vector, the first or second sensor data comprising data representative of the tool orientation vector. In some examples, the second joint characteristic vector comprises a base plate perpendicular vector that is determined based on the tool orientation vector during the second time period, and the first joint characteristic vector comprises a joint orientation vector that is determined based on: the base plate perpendicular vector and the joint perpendicular vector that is perpendicular to the joint plane, or the joint parallel plane and a base plate surface plane that is perpendicular to the base plate perpendicular vector.

In some examples, the method further comprises identifying a slope of a joint that is parallel to the joint orientation vector, the slope being identified based on the joint orientation vector, or the base plate surface plane, and a gravity direction detected by the sensor system; and providing feedback, via a user interface, based on the slope of the workpiece. In some examples, the sensor system is attached to, or integrated with, the welding-type tool, the tool orientation of the welding-type tool corresponds to a tool orientation vector defined relative to a sensor reference frame of the sensor system, the first or second sensor data is representative of the tool orientation vector or the sensor reference frame, or the sensor system comprises an inertial measurement unit comprising an accelerometer, a gyroscope, or a magnetometer. In some examples, the first and second time periods overlap, the third time period comprises a time period when a welding-type operation occurs, the welding technique parameter value comprises a work angle value or a travel angle value of the welding-type tool, or the method further comprises providing feedback, via a user interface, based on the welding technique parameter value.

Some examples of the present disclosure relate to a weld monitoring system, comprising: a sensor system; and processing circuitry configured to: determine a first joint characteristic vector based on first sensor data detected during a first time period by a sensor system, the first sensor data being representative of a tool orientation of a welding-type tool during the first time period, determine a second joint characteristic vector based on second sensor data detected during a second time period by the sensor system, the second sensor data being representative of the tool orientation of the welding-type tool during the second time period, track, during a third time period the tool orientation of the welding-type tool using third sensor data detected by the sensor system during a third time period; and identify a welding technique parameter value based on the tool orientation of the welding-type tool during the third time period and the first and second joint characteristic vectors.

In some examples, the tool orientation of the welding-type tool corresponds to a tool orientation vector, the first or second sensor data comprising data representative of the tool orientation vector. In some examples, the first joint characteristic vector or the second joint characteristic vector comprises a base plate perpendicular vector that is parallel to the tool orientation vector during the first time period or the second time period, respectively, or the first joint characteristic vector or the second joint characteristic vector comprises a joint orientation vector that is parallel to the tool orientation vector during the first time period or the second time period, respectively. In some examples, the first joint characteristic vector comprises a base plate perpendicular vector that is parallel to the tool orientation vector during the first time period, and the second joint characteristic vector comprises a joint orientation vector that is perpendicular to both the tool orientation vector during the second time period and the base plate perpendicular vector, or the first joint characteristic vector comprises a joint orientation vector that is parallel to the tool orientation vector during the first time period, and the second joint characteristic vector comprises a base plate perpendicular vector that is perpendicular to both the tool orientation vector during the second time period and the joint orientation vector.

In some examples, the sensor system is attached to, or integrated with, the welding-type tool, the tool orientation of the welding-type tool corresponds to a tool orientation vector defined relative to a sensor reference frame of the sensor system, the first or second sensor data is representative of the tool orientation vector or the sensor reference frame, and the sensor system comprises an inertial measurement unit comprising an accelerometer, a gyroscope, or a magnetometer. In some examples, the system further comprises a user interface configured to provide feedback based on the welding technique parameter value, the welding technique parameter value comprising a work angle value or a travel angle value of the welding-type tool, and the third time period comprising a time period when a welding-type operation occurs.

FIG. 1 shows an example welding system 100. In some examples, the welding system 100 may be used for live welding operations, such as, for example, in the fabrication of one or more parts. In some examples, the welding system 100 may be used for weld training, such as, for example, virtual, augmented, and/or mixed reality weld training. As shown, the welding system 100 includes a welding stand 102, several sensors 104 (part of and/or separate from the welding stand 102), welding-type equipment 106, a welding helmet 108, a welding-type tool 112, and computing device 114.

While shown as a welding torch or gun configured for gas metal arc welding (GMAW) in the example of FIG. 1, in some examples, the welding-type tool 112 may instead be a different kind of welding-type tool 112. For example, the welding-type tool 112 may be an electrode holder (i.e., stinger) configured for shielded metal arc welding (SMAW), a torch and/or filler rod configured for gas tungsten arc welding (GTAW), a welding gun configured for flux-cored arc welding (FCAW), and/or a plasma cutter. While shown as a live welding-type tool 112 in the example of FIG. 1, in some examples, the welding-type tool 112 may be a mock welding-type tool, and/or be configured for mock (as opposed to live) welding-type operations, such as for (e.g., virtual/augmented reality) weld training.

In the example of FIG. 1, the welding-type tool 112 is shown being held by an operator 110 wearing the welding helmet 108. In the example of FIG. 1, the welding helmet 108 includes a helmet display screen 116, helmet user interface (UI) devices 117, helmet sensors 104*b*, and helmet circuitry 118.

In some examples, the helmet UI devices 117 may include knobs, buttons, levers, switches, touch screens, microphones, speakers, haptic devices, lights (e.g., LEDs), eye trackers, and/or other appropriate helmet UI devices 117. In some examples, the helmet sensors 104*b* may include optical, camera, infra-red, heat, ultrasonic, electromagnetic, and/or other appropriate sensors. In some examples, the helmet sensors 104*b* may be used to determine whether a (e.g., live) welding-type operation is taking place (e.g., via measurement of accompanying light, heat, sound, electromagnetic fields, etc.). While shown on the outside of the welding helmet 108 in the example of FIG. 1, in some examples, one or more of the helmet UI devices 117 and/or helmet sensors 104*b* may be positioned within the welding helmet 102. In some examples, the helmet display screen 116 may be considered part of the helmet UI devices 117. In some examples, the helmet UI devices 117 and/or helmet sensors 104*b* may be electrical communication with the helmet circuitry 118.

In some examples, the helmet circuitry 118 may include helmet processing circuitry, helmet memory circuitry, helmet UI circuitry, and/or helmet communication circuitry. In some examples, the helmet UI circuitry may drive the helmet UI devices 117. In some examples, the welding helmet 108 may communicate with one or more external devices via one or more signals sent or received by the helmet communication circuitry.

In the example of FIG. 1, the welding-type tool 112 is shown applying a welding arc 119 to a joint 120 between two workpieces 122 (e.g., to weld the workpieces 122 together at the joint 120). As shown, the welding-type tool 112 is connected to a welding cable 121 that leads to, and puts the welding-type tool 112 in electrical communication with, the welding-type equipment 106. In some examples, welding-type power (and/or consumables) for the welding arc 119 may be provided to the welding-type tool 112, by the welding equipment 106, via the welding cable 121. In some examples, the welding-type tool 112 may transmit one or more signals to the welding-type equipment 106 when activated (e.g., via the welding cable 121), and the welding-type equipment 106 may provide the welding-type power (and/or consumables) for the arc 119 in response.

In the example of FIG. 1, the welding-type equipment 106 comprises a welding-type power supply 126, wire feeder 128, and gas supply 130. In some examples, the wire feeder 128 may be configured to feed wire to the welding-type tool 112 (e.g., via welding cable 121). In some examples, the gas supply 130 may be configured to route shielding gas to the welding-type tool 112 (e.g., via welding cable 121). In some examples, the power supply 126 may be configured to route welding-type power and consumables (e.g., gas and/or wire) to the welding-type tool 112 (e.g., via welding cable 121).

In the example of FIG. 1, the power supply 126 includes power communication circuitry 132, power control circuitry 134, and power conversion circuitry 136 interconnected with one another. In some examples, the power supply 126 may communicate with one or more external devices via one or more signals sent or received by the power communication circuitry 132. In some examples, the power conversion circuitry 136 may be configured to receive input power (e.g., from a generator, a battery, mains power, etc.) and convert the input power to welding-type output power, such as might be suitable for use by the welding-type tool 112 for welding-type operations. In some examples, the power control circuitry 134 may be configured to control operation of the power communication circuitry 132 power conversion circuitry 136, wire feeder 128, and/or gas supply 130 (e.g. via one or more control signals) in accordance with one or more welding parameters.

In the example of FIG. 1, the welding-type equipment 106 further includes an operator interface 138. In some examples, the operator interface 138 may comprise one or more display screens, touch screens, knobs, buttons, levers, switches, microphones, speakers, lights, and/or other mechanisms through which an operator 110 may provide input to, and/or receive output from, the welding-type equipment. For example, an operator 110 may use the operator interface 138 to input one or more welding parameters (e.g., target voltage, current, wire feed speed, wire/filler type, wire/filler diameter, gas type, gas flow rate, welding-type process, material type of workpiece 122, position of welding-type process, etc.). As another example, the operator 110 may use the operator interface 138 to view and/or otherwise understand the current welding parameters of the welding-type equipment 106.

While shown as part of the power supply 126 in FIG. 1, in some examples, the operator interface 138, power control circuitry 134, and/or power communication circuitry 132 (and/or some other control/communication circuitry) may be part of the wire feeder 128 and/or gas supply 130. In some examples, the welding-type equipment 106 may be omitted entirely, or may be mock and/or simulated welding-type equipment 106, such as may be used for training, simulated, and/or mock welding-type operations.

In the example of FIG. 1, the welding-type equipment 106 is connected to a support platform 150 of the welding stand 102 via a clamp 123 that is connected to the welding-type equipment 106 via a clamp cable 124. In some examples, the clamp 123 may be attached to a workpiece 122, some other portion of the welding stand 102, or some other piece of equipment, instead of the support platform 150. During live welding, the support platform 150, workpiece(s) 122, clamp 123, welding-type tool 112, clamp cable 124 and/or welding cable 121 may form a closed circuit through which welding-type output power may be routed. As shown, the welding-type equipment 106 also has a separate (e.g., data) connection to the welding stand 102 via data cable 125, though, in some examples, the welding stand 102 may instead be in wireless communication with the welding-type equipment 106 (and/or welding helmet 108 welding-type tool 112, etc.).

In the example of FIG. 1, the support platform 150 of the welding stand 102 provides support for one or more workpieces 122 through a fixture 127 supported by the support platform 150. In some examples, the fixture 127 may be electrically conductive, and thereby able to complete the welding circuit necessary for the welding arc. As shown, the fixture 127 holds the workpieces 122 together at a joint 120. In the example of FIG. 1, the joint 120 is sloped at angle such that the joint 120 is neither entirely horizontal nor entirely vertical (and yet also both partially horizontal and partially vertical).

In the example of FIG. 1, the support platform 150 of the welding stand 102 also provides support for a platform placard 154. As shown, the platform placard 154 is positioned on, and/or attached to, the support platform 150. While shown as positioned on the support platform 150 in the example of FIG. 1, in some examples, the platform placard 154 may instead be positioned on a shelf 156 of the welding stand 102, elsewhere on the welding stand 102, and/or elsewhere in the welding system 100.

In the example of FIG. 1, the platform placard 154 includes three markers 199 aligned in a horizontal plane that is parallel to the horizontal surface of the support platform 150. In some examples, sensors 104 of the welding system 100 may be configured to detect the markers 199 on the platform placard 154 and/or otherwise recognize the platform placard 154. In some examples, the welding system 100 may be configured to identify a plane in which the platform placard 154 lies, and/or in which the markers 199 are aligned, and determine a direction of gravity based on (e.g., perpendicular to) the plane. In some examples, the welding system 100 may determine the direction of gravity based on the plane and/or one or more offsets/constants (e.g., input and/or stored in memory).

In the example of FIG. 1, the welding stand 102 further includes a shelf 156 attached to an arm 160 that extends from the support platform 150. As shown, a shelf placard 166 is positioned on, and/or attached to, the shelf 156. While shown as positioned on the shelf 156 in the example of FIG. 1, in some examples, the shelf placard 166 may instead be positioned on the support platform 150, the arm 160, elsewhere on the welding stand 102, and/or elsewhere in the welding system 100.

In the example of FIG. 1, the shelf placard 166 includes two markers 199 that are vertically aligned. In some examples, sensors 104 of the welding system 100 may be configured to detect the markers 199 on the shelf placard 166 and/or otherwise recognize the shelf placard 166. In some examples, the welding system 100 may be configured to determine a direction of gravity based on (e.g., parallel to) the detected alignment of the markers 199 on the shelf placard 166 and/or recognized orientation of the shelf placard 166. In some examples, the welding system 100 may determine the direction of gravity based on the orientation of the markers 199, orientation of the shelf placard 166, and/or one or more offsets/constants (e.g., input and/or stored in memory).

Though sometimes discussed herein as a direction of gravity, in some examples, the direction determined from the platform placard 154 and/or shelf placard 166 may not actually be precisely parallel to the direction of gravity. For example, the support platform 150 may be on a floor that is inclined, or the cabinet 151, shelf 156, arm 160 and/or markers 199 slightly misaligned, in which case the plane of the platform placard 154, and/or orientation of the shelf placard 166, may not be perfectly perpendicular/parallel to gravity. In such examples, a direction perpendicular/parallel to the platform placard 154/shelf placard 166 might be more of a gravitational approximation, or pseudo gravitational direction, than a precise direction of gravity. Nevertheless, for the purposes of this disclosure, such a gravitational approximation, or pseudo gravitational direction is sufficient. Therefore, it should be understood that, where a direction of gravity is discussed below, the direction may actually be a gravitational approximation or pseudo gravitational direction rather than a direction precisely parallel to the actual direction of gravity.

In the example of FIG. 1, the shelf 156 also supports mouse 161 and keyboard 162. In some examples, the mouse 161 and keyboard 162 may be considered input devices of the welding stand 102 and/or welding system 100. In some examples, additional input devices may be provided, such as, for example, one or more microphones. In some examples, the welding-type tool 112 may include one or more input devices that allow the welding-type tool 112 to also be used as an input device.

In the example of FIG. 1, the welding system 100 further includes several output devices. For example, as shown, the welding stand 102 includes a display monitor 158 connected to the arm 160 of the welding stand 102. In the example of FIG. 1, the display monitor 158 has a display screen 159. In some examples, the display screen 159 may be a touch screen, and thus may be considered an input device. In some examples, the display screen 159 may comprise an output device configured for displaying parameters, feedback, and/or other information pertaining to the welding system 100. In some examples, the display monitor 158 may include additional output devices, such as audio speakers, for example.

In the example of FIG. 1, the welding system 100 further includes other output devices, embodied in a stack light 172 and vibration device 174 are shown. In some examples, the stack light 172 may comprise with a variety of different (e.g., color, shape, size, etc.) lights that may be illuminated in various ways (e.g., based on one or more received signals). In some examples, the vibration device 174 that may provide vibration feedback in various ways/patterns (e.g., based on one or more received signals).

In the example of FIG. 1, the welding stand 102 further includes a sensor assembly 170 attached to the arm 160. As shown, the sensor assembly 170 includes a plurality of sensors 104*a* oriented towards the platform 150, operator 110, and/or welding-type tool 112. In some examples, the sensor assembly 170 may be adjustable, such as via one or more knobs and/or other adjustment mechanisms. In some examples, the sensor assembly 170 (and/or sensors 104*a*) may be configured to record sensor data relating to objects in the welding environment (and/or in a field of view of the sensors 104) during a (e.g., live or simulated) welding operation.

In the example of FIG. 1, the welding system 100 also includes several sensors 104 (e.g., unattached to the welding stand 102) that are configured to record sensor data relating to objects in the welding environment (and/or in a field of view of the sensors 104). As shown, in addition to sensors 104*a*, the welding system 100 includes helmet sensors 104*b* attached to the welding helmet 108, and environment sensors 104*c* positioned around the welding environment. This arrangement of sensors 104 may enable some sensors 104 to monitor the welding environment (e.g., track movement of an object) when other sensors 104 are obscured.

In some examples, one or more of the sensors 104 may comprise, for example, one or more motion sensors, depth sensors, camera sensors (e.g., infrared cameras, visible spectrum cameras, high dynamic range cameras, etc.), acoustic sensors, optical sensors, radio frequency (RF) sensors, ultrasonic sensors, magnetic sensors, acceleration sensors (e.g., accelerometers), gyroscopic sensors, and/other appropriate sensors. In some examples, the sensor data captured by the sensors 104 may comprise one or more images, videos, sounds, temperatures, radio waves, heat waves, radiation measurements, and/or other appropriate data. In some examples, the acceleration sensor(s) 104 may detect the direction(s) and/or magnitude(s) of linear acceleration(s) (e.g., due to gravity, etc.). In some examples, the sensor data may allow the welding stand 102 to track, detect, and/or record positions, orientations, and/or movement of objects (e.g., operator 110, welding-type tool 112, workpiece(s) 122, placards 154/166, etc.) in the welding environment during a welding operation.

In the example of FIG. 1, the welding-type tool 112 includes markers 199 on a nozzle 299 of the welding-type tool 112 (see also, e.g., FIGS. 8*a*-8*b*). In some examples, the welding-type tool 112 may include markers 199 positioned elsewhere on the tool 112 (e.g., on the handle, neck, etc.). In some examples, the fixed arrangement of markers 199 on the surface of the welding-type tool 112 may define a rigid body that allows the welding system 100 to track the welding-type tool 112 (e.g., via sensors 104), and/or determine the position and/or orientation of the welding-type tool 112.

As discussed above, the placards 154/166 also includes markers 199. In some examples, the workpiece(s) 122 may also include one or more markers 199. In some examples, the markers 113 may be passive markers, such as, for example, reflective markers. In some examples, the markers 113 may be active markers, such as, for example, light-emitting markers (e.g., light-emitting diodes (LEDs)). In some examples, the markers 113 may assist the welding system 100 (e.g., via sensors 104) in tracking and/or determining a position and/or orientation of the object on which the markers are placed.

In the example of FIG. 1, the welding system 100 includes a computing device 114 that is positioned with in a cabinet 151 of the welding stand 102. In some examples, the computing device 114 may be otherwise positioned. In some examples, the computing device 114 may be an appropriate computational apparatus, such as, for example, a desktop computer, a laptop computer, a tablet computer, smart phone, other mobile device, and/or a web server. Though shown as being physically connected to the welding-type equipment 106 via data cable 125, in some examples, the computing device 114 may instead be in wireless communication with the welding-type equipment 106 (and/or welding helmet 108). While shown as a separate and distinct entity in the example of FIG. 1, in some examples, the computing device 114 may instead be implemented via the welding-type equipment 106, welding helmet 108, and/or a sensor module 200 (discussed below with respect to FIGS. 2*a*-2*b*).

In some examples, the sensors 104 and/or input/output devices (e.g., display screen 159, mouse 161, keyboard 162, etc.) may be communicatively coupled to the computing device 114 of the welding stand 102. For example, the sensors 104 and/or input/output devices may comprise communication circuitry to facilitate wired and/or wireless communication with the computing device 114. In some examples, the input devices are configured to provide user input data to the computing device, such as via one or more user input signals, for example. In some examples, the output devices are configured to receive output data from the computing device 114, such as via one or more user output signals, for example In some examples, the sensors 104 are configured to provide sensor input data (e.g., image data, acoustic data, RF data, ultrasonic data, etc.) to the computing device 114, such as via one or more sensor input signals, for example. In some examples, the sensors 104 are further configured to receive sensor output data (e.g., configuration data, setup data, commands, register settings, etc.) from the computing device 114, such as via one or more sensor output signals, for example.

In the example of FIG. 1, the welding system 100 further includes a sensor module 200. As shown, the sensor module 200 is attached to a rear end of the welding-type tool 112. In some examples, the sensor module 200 may also be in communication with the computing device 114 of the welding stand 102.

In some examples, it may be more convenient to use the sensor module 200 than the other sensors 104 (and/or helmet sensors 104*b*) of the welding system 100. For example, the sensor module 200 may be able to travel with the welding-type tool 112 and therefore may never be unable to detect data relating to the welding-type tool 112 due to obstruction (e.g., unlike some other sensors 104). In some examples, the welding system 100 may be configured to be able to fully operate using only the sensor(s) of the sensor module 200.

Figures 2A, 2B:
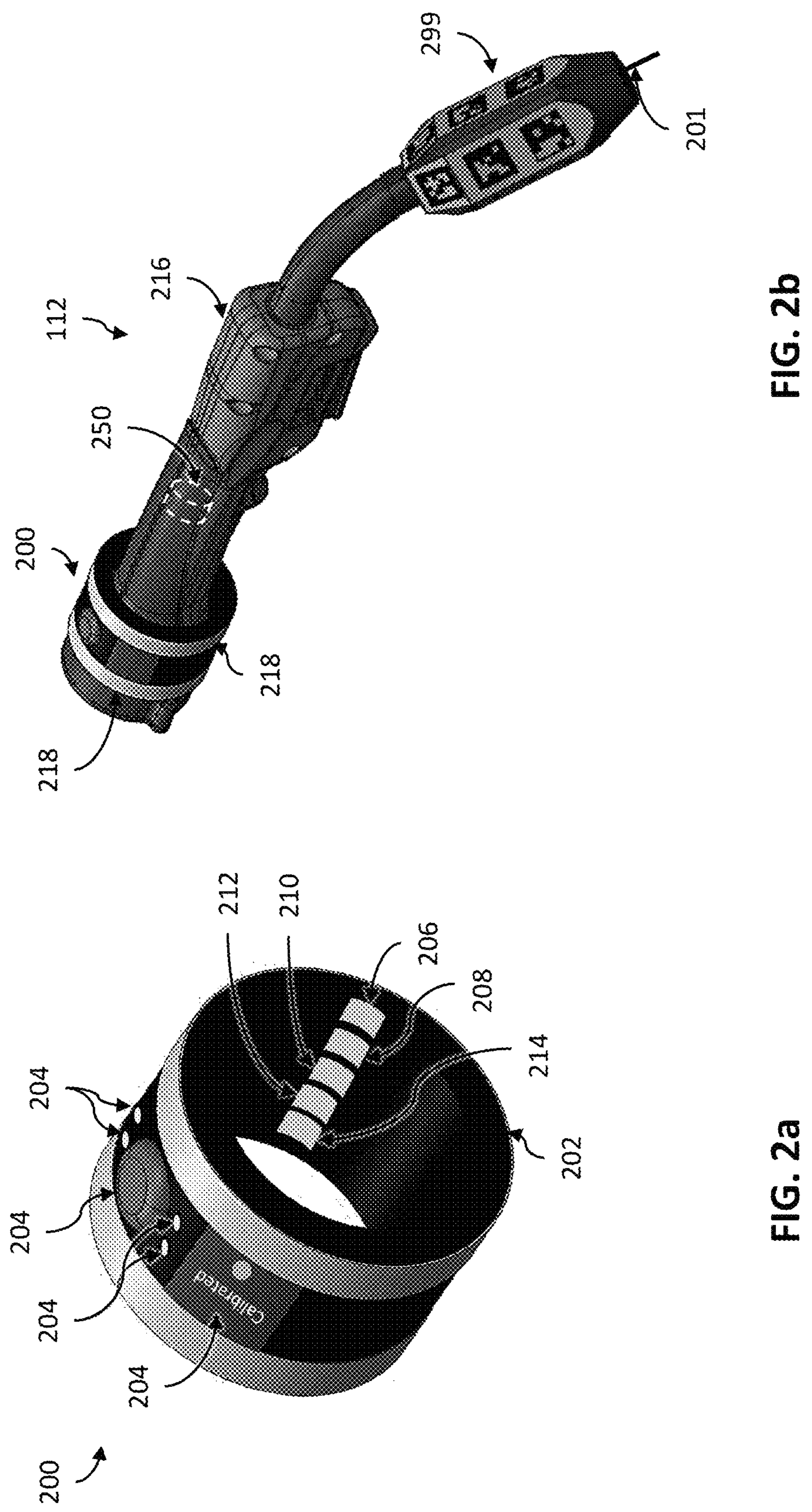
FIG. 2*a* shows an example of sensor module, in accordance with aspects of this disclosure.
FIG. 2*b* shows the example sensor module of FIG. 2*a* attached to a welding-type tool of the welding system of FIG. 1, in accordance with aspects of this disclosure.

FIGS. 2*a*-2*b* show enlarged views of an example sensor module 200. In the example of FIG. 2*a*, the sensor module 200 has an annular module housing 202 on which is disposed several module input/output (I/O) devices 204. In some examples, the module I/O devices 204 include one or more knobs, buttons, levers, switches, (e.g., touch) display screens, microphones, speakers, haptic devices, lights (e.g., LEDs), and/or other appropriate I/O devices. While some module I/O devices 204 are shown on the module housing 202 in the example of FIG. 2*a*, in some examples, other module I/O devices 204 may be disposed within the module housing 202.

In the example of FIG. 2*a*, the sensor module 200 includes module circuitry 212 and a module power supply 214 disposed within a module housing (discussed further below with respect to FIG. 3). As shown, the sensor module 200 also has an inertial measurement unit (IMU) 206, a current sensor 208, and other sensors 210 (e.g., a camera and/or optical sensors) disposed within the module housing 202. While one IMU 206 and one current sensor 208 is shown in the example of FIG. 2*a*, in some examples the sensor module 200 may include multiple IMUs 206 and/or current sensors 208.

In some examples, the current sensor 208 may be a Hall Effect sensor configured to detect when current is flowing to the welding-type tool 112 (e.g., through the hollow center of the annular module housing 202). In some examples, the current sensor 208 may alternatively, or additionally, physically connect to the conductor(s) carrying current from the welding-type equipment 106 to the welding-type tool 112 (e.g., through the welding cable 121), and/or through the welding-type tool 112 to an electrode 201 at the end of the welding-type tool 112 (see, e.g., FIG. 2*b*). In some examples, the current sensor 208 may alternatively, or additionally, physically connect to the conductor(s) carrying the trigger signal(s) from the welding-type tool 112 to the welding-type equipment 106. In some examples, the other sensors 210 may include one or more electromagnetic field (EMF) sensors, thermal sensors, acoustic sensors, optical sensors, ultrasonic sensors, and/or other appropriate sensors.

In some examples, the IMU 206 may include one or more accelerometers, gyroscopes, and/or magnetometers (e.g., compasses). In some examples, the accelerometer(s) of the IMU 206 may detect the direction(s) and/or magnitude(s) of linear acceleration(s) experienced by the sensor module 200 along all 3 axes (e.g., due to gravity, movement, etc.). In some examples, the majority of the measured acceleration will be due to the force of gravity during the relatively slow motions associated with welding-type operations.

In some examples, the gyroscope(s) and/or accelerometer(s) of the IMU 206 may detect and/or measure angular motions and/or angular velocities of the sensor module 200 about all three axes. In some examples, measurements of the gyroscope(s) and/or accelerometer(s) may be integrated over time to yield absolute yaw, pitch, and/or roll angles.

In some examples, the magnetometer is used to increase the stability and accuracy of rotation measurements about a gravity vector. In some examples, data from the magnetometer(s) may be considered unreliable and/or ignored when an EMF sensor detects a significant electromagnetic field (e.g., with strength above a threshold), when the current sensor 208 detects a current above a threshold, and/or when there is some other indication (e.g., from the welding-type tool 112, welding-type equipment 106, sensor(s) 104, etc.) that a (e.g., live) welding-type operation is occurring. In some examples, the magnetometer may be manually (e.g., using I/O devices 204), and/or automatically, disabled when the data from the magnetometer(s) becomes unreliable, when a welding-type operation is occurring nearby, and/or when there is a substantial electromagnetic field nearby.

In some examples, data from the gyroscope(s), accelerometer(s), and/or magnetometer may be combined using a sensor fusion technique (e.g., Complementary Filter, Kalman Filter, etc.) to yield accurate linear and/or angular motion data. In some examples where multiple IMUs 206 are used, the data from the IMUs 206 (and/or information derived from the data) may be combined (e.g., averaged) to increase accuracy and/or alleviate the negative impact of drift. In some examples where multiple IMUs 206 are used, and the data of one IMU 206 (and/or its sensor(s)) drifts more than a threshold relative to the data of the other IMUs 206 (and/or their sensor(s)), the drifting IMU 206 (and/or its sensor(s)) may be ignored, and the sensor module 200 may continue to operate using the other IMUs 206. In some examples, the sensor module 200 may track a movement and/or orientation of the welding-type tool 112 using the detections and/or measurements of the accelerometer(s), gyroscope(s), and/or magnetometer(s) of the IMU(s) 206.

In the example of FIG. 2*b*, the sensor module 200 is shown attached to a rear portion of a handle 216 of the welding-type tool 112. More particularly, the sensor module 200 is secured to the handle 216 of the welding-type tool 112 by hose clamps 218. In some examples, other mechanisms may instead, or additionally, be used to secure the sensor module 200 to the welding-type tool 112, such as, for example, hook and loop fasteners, adhesive, screws, bolts, clamps, and/or other appropriate mechanisms. FIG. 2*b* also shows a sensor module 250 (e.g., similar to the sensor module 200) integrated into, rather than attached to, the handle 216 of the welding-type tool 112.

Figure 3:
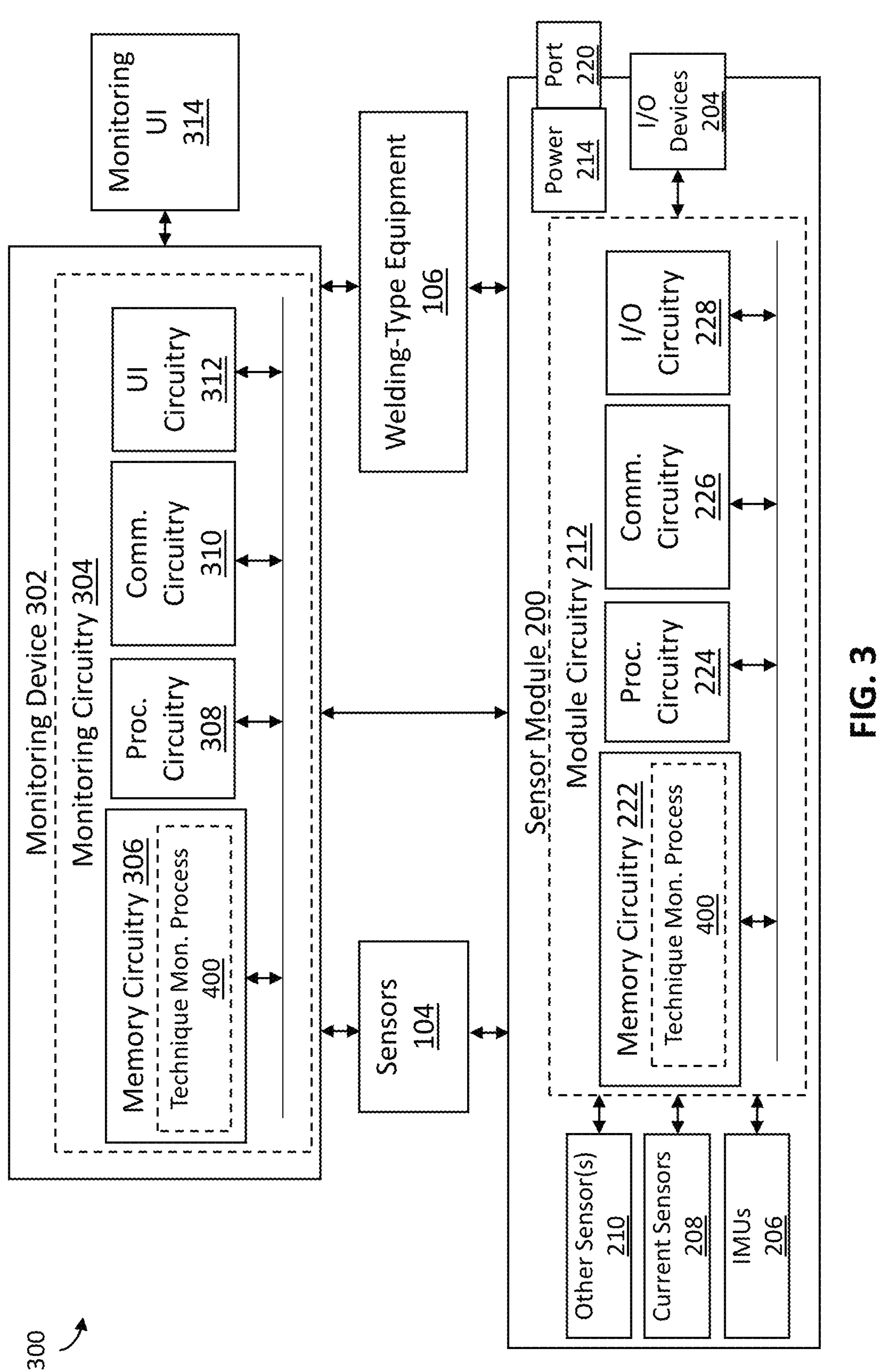
FIG. 3 is a block diagram showing an example welding technique monitoring system, in accordance with aspects of this disclosure.

FIG. 3 is a block diagram showing an example welding technique monitoring system 300. As shown, the welding technique monitoring system 300 includes a monitoring device 302, the sensor module 200, and the welding-type equipment 106, in communication with one another. In the example of FIG. 3, the sensors 104 are also in communication with the monitoring device 302 and the sensor module 200.

While shown as a separate entity in the example of FIG. 3, in some examples, some or all of the monitoring device 302 may be implemented by the sensor module 200, and/or welding-type equipment 106. In some examples, some or all of the monitoring device 302 may be implemented by the computing device 114 and/or welding helmet 108.

In the example of FIG. 3, the monitoring device 302 includes monitoring circuitry 304. As shown, the monitoring circuitry 304 includes monitoring memory circuitry 306, monitoring processing circuitry 308, monitoring communication circuitry 310, and monitoring UI circuitry 312 interconnected with one another via a common electrical bus. In the example of FIG. 3, the welding technique monitoring system 300 also includes a monitoring UI 314 in communication with monitoring device 302. In some examples, the monitoring UI 314 may be implemented by the input/output devices of the welding stand 102, the helmet UI devices 117, operator interface 138 of the welding-type equipment 106, and/or module I/O devices 204 of the sensor module 200.

In the example of FIG. 3, the sensor module 200 includes the module I/O devices 204, IMU 206, current sensor 208, other sensors 210, module circuitry 212, and module power supply 214. As shown, the module power supply 214 is connected to a power port 220. In some examples, the module power supply 214 may receive external power via the power port 220 (e.g., via a power cord connected to the power port 220). While not shown for the sake of simplicity, in some examples, the module power supply 214 may be electrically connected (and/or provide power to) to the module I/O devices 204, IMU 206, current sensor 208, other sensors 210, and/or module circuitry 212.

In the example of FIG. 3, the module circuitry 212 includes module memory circuitry 222, module processing circuitry 224, module communication circuitry 226, and module I/O circuitry 228 interconnected with one another via a common electrical bus. As shown, the module circuitry 212 is in electrical communication with the module I/O devices 204, IMU 206, current sensor 208, and other sensors 210. While shown as separate, in some examples, some or all of the module circuitry 212 (or additional module circuitry 212) may be part of the IMU 206, current sensor 208, and/or other sensors 210.

In some examples, the monitoring UI circuitry 312 and/or module I/O circuitry 228 may comprise one or more drivers for the monitoring UI 314 and/or module I/O devices, respectively. In some examples, the monitoring UI circuitry 312 and/or module I/O circuitry 228 may be configured to generate one or more signals representative of input received via the monitoring UI 314 and/or module I/O devices, respectively, and provide the signal(s) to the bus. In some examples, the monitoring UI circuitry 312 and/or module I/O circuitry 228 may also be configured to control the monitoring UI 314 and/or module I/O devices, respectively, to generate one or more outputs in response to one or more signals (e.g., received via the bus).

In some examples, the monitoring communication circuitry 310 and/or module communication circuitry 226 may include one or more wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the monitoring communication circuitry 310 and/or module communication circuitry 226 may be configured to facilitate communication via one or more wired media and/or protocols (e.g., Ethernet cable(s), universal serial bus cable(s), etc.) and/or wireless mediums and/or protocols (e.g., cellular communication, general packet radio service (GPRS), near field communication (NFC), ultra high frequency radio waves (commonly known as Bluetooth), IEEE 802.11x, Zigbee, HART, LTE, Z-Wave, WirelessHD, WiGig, etc.). In some examples, the monitoring communication circuitry 310 and/or module communication circuitry 226 may be coupled to one or more antennas to facilitate wireless communication.

In some examples, the monitoring communication circuitry 310 and/or module communication circuitry 226 may be configured to facilitate internal and/or external communications. In some examples, the monitoring communication circuitry 310 and/or module communication circuitry 226 may receive one or more signals (e.g., from each other and/or the welding-type equipment 106) decode the signal(s), and provide the decoded data to the electrical bus. As another example, the monitoring communication circuitry 310 and/or module communication circuitry 226 may receive one or more signals from the electrical bus (e.g., representative of one or more inputs received via the monitoring UI circuitry 312 and/or I/O circuitry 308) encode the signal(s), and transmit the encoded signal(s) to an external device.

In some examples, the monitoring processing circuitry 308 and/or module processing circuitry 224 may comprise one or more processors, controllers, and/or graphical processing units (GPUs). In some examples, the monitoring processing circuitry 308 and/or module processing circuitry 224 may comprise counter circuitry and/or clock circuitry. In some examples, the monitoring processing circuitry 308 and/or module processing circuitry 224 may be configured to execute machine readable instructions stored in the monitoring memory circuitry 306 and/or module memory circuitry 222.

In the example of FIG. 3, the monitoring memory circuitry 306 and module memory circuitry 222 includes (and/or stores) a welding technique monitoring process 400. The technique monitoring process 400 is shown as being part of (and/or stored in) both the monitoring memory circuitry 306 and module memory circuitry 222 to indicate that, in some examples, either or both the monitoring device 302 and/or sensor module 200 may perform part, or all, of the technique monitoring process 400. In the discussion below, the general term memory is sometimes used to refer to monitoring memory circuitry 306 and/or module memory circuitry 222. In the discussion below, certain items and/or information is sometimes described as being included, stored, and/or recorded in memory as a shorthand for specifying that data representative of those items and/or information is included, stored, and/or recorded in memory.

In some examples, the technique monitoring process 400 may comprise machine readable instructions stored in memory and/or configured for execution by the monitoring processing circuitry 308 and/or module processing circuitry 224. In some examples, the technique monitoring process 400 may be implemented via discrete circuitry (e.g., of the monitoring processing circuitry 308 and/or module processing circuitry 224) rather than, or in addition to, instructions stored in the monitoring memory circuitry 306 and/or module memory circuitry 222. In the discussion below, the term processing circuitry is sometimes used to refer to the monitoring processing circuitry 308 and/or module processing circuitry 224.

While not shown in the example of FIG. 3, in some examples, the monitoring memory circuitry 306 and/or module memory circuitry 222 may also include (and/or store) machine readable instructions comprising counter and/or clock programs. In some examples, the memory circuitry 306 and/or module memory circuitry 222 may also include (and/or store) several different (e.g., rigid body) models of different welding-type tools 112. In some examples, the memory circuitry 306 and/or module memory circuitry 222 may also include (and/or store) one or more of the thresholds discussed herein.

In some examples, the monitoring memory circuitry 306 and/or module memory circuitry 222 may also include (and/or store) values for one or more determined, target, present, and/or past parameters, such as, for example, welding parameters (e.g., voltage, current, wire feed speed, gas flow rate, etc.), welding technique parameters (e.g., work angle, travel angle, travel speed, travel direction, etc.), weave parameters (e.g., frequency, weave width, dwell time, etc.), sensor parameters (e.g., sensor orientation reference frame, tool orientation vector, etc.), joint parameters (e.g., joint orientation vector, base plate perpendicular vector, base plate surface vector, etc.), and/or operation parameters (e.g., job type/identifier(s), operator identifier(s), weld cell identifier(s), project identifier(s), welding procedure specification (WPS) information, work order information, equipment type/identifier(s), weld number information, etc.). In some examples, one or more parameters may be associated with timestamp information, one or more other parameters, and/or other information. In some examples, the technique monitoring process 400 may use and/or update one or more of the stored parameters during operation.

Figure 4:
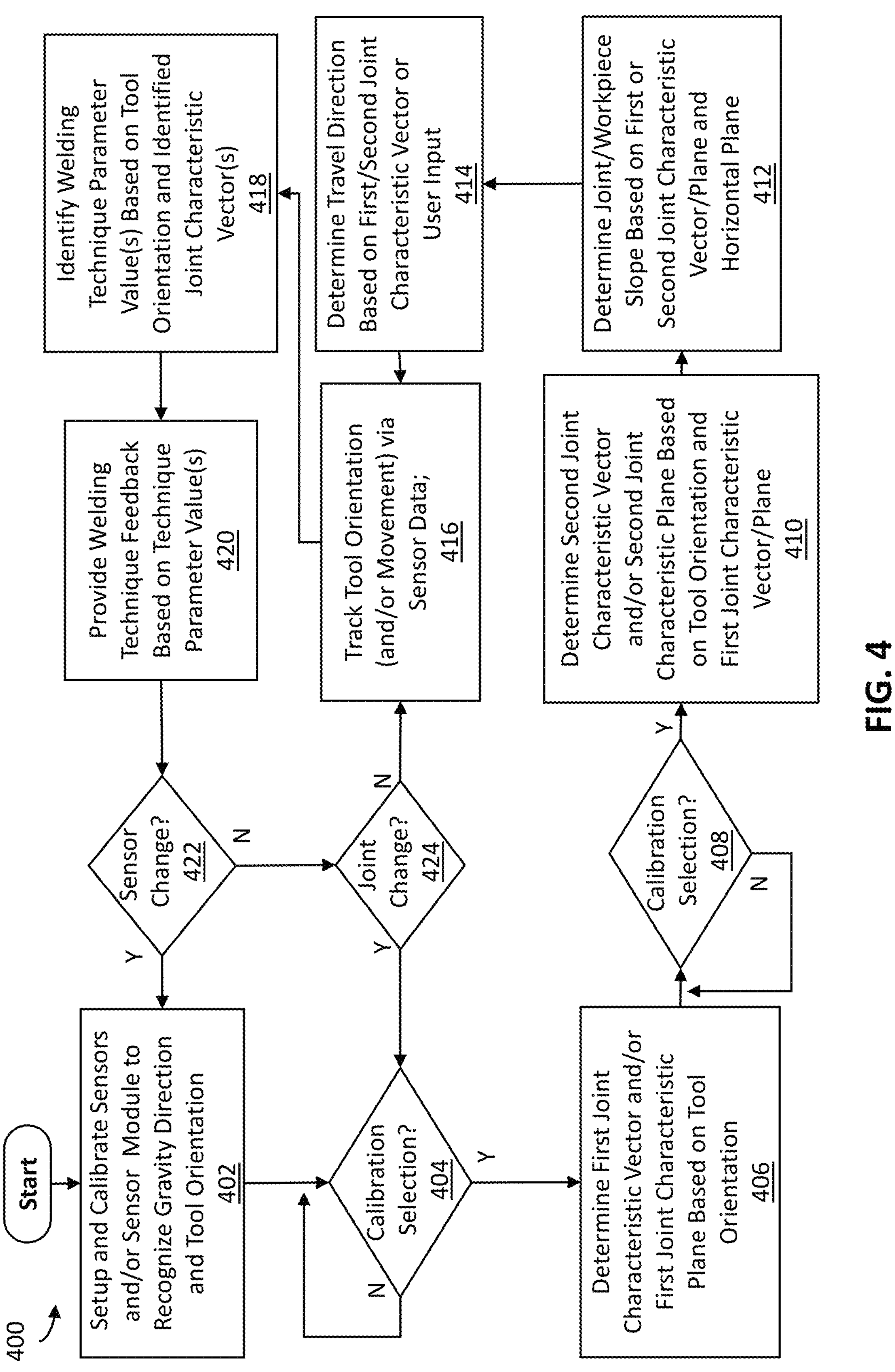
FIG. 4 is a flow diagram illustrating an example operation of a technique monitoring process of the welding technique monitoring system of FIG. 3, in accordance with aspects of this disclosure.

FIG. 4 is a flowchart illustrating operation of an example technique monitoring process 400. In some examples, during the technique monitoring process 400, the processing circuitry uses sensor data from the sensor module 200 to track an orientation of the welding-type tool 112 and/or provide real-time feedback regarding welding technique parameters based on the orientation of the welding-type tool 112. As used herein, real-time means occurring immediately while allowing for processing time, to create the impression of immediacy to a user. In some examples, during the technique monitoring process 400, the processing circuitry also uses information about the joint 120 being welded (i.e., joint characteristic information) to derive the welding technique parameters. In some examples, during the technique monitoring process 400, two calibration steps (or one fluid calibrating movement) may be used to obtain the joint characteristic information necessary for monitoring of welding technique.

In the example of FIG. 4, the technique monitoring process 400 begins at block 402, where the processing circuitry performs certain setup procedures. In some examples, the setup procedures of block 402 may include setting up and/or calibrating the technique monitoring system 300 to recognize a direction of gravity. In some examples, the technique monitoring process 300 may use the direction of gravity to facilitate determination of certain characteristics about the joint 120. In some examples, this setup/calibration may be as simple as initializing the IMU(s) 206 of the sensor module 200 and/or one or more acceleration sensors 104. In such examples, the acceleration sensor(s) may detect an acceleration due to the Earth's gravitational pull, and monitor/record the direction of the acceleration due to gravity in the form of a gravity vector 510 (see, e.g., FIG. 5*b*).

In some examples, the technique monitoring system 300 may use the platform placard 154 and/or shelf placard 166 to identify a direction of gravity (i.e., gravity vector 510), as discussed above. For example, the processing circuitry 204 may determine an orientation of the platform placard 154 and/or shelf placard 166 based on sensor data detected by the sensor(s) 104 and/or models of the platform placard 154 and/or shelf placard 166 (e.g., stored in memory circuitry 206). In some examples, the markers 199 on the platform placard 154 and/or shelf placard 166 may facilitate the detection of the platform placard 154 and/or shelf placard 166, and/or the orientation determination.

In some examples, the setup procedures of block 402 may include identifying certain (e.g., welding, operation, etc.) parameters at that will be used during the technique monitoring process 400. In some examples, this identification may involve input from the operator 110 (e.g., via the monitoring UI 314 and/or module I/O devices 204). In some examples, this identification may involve communication with the welding-type equipment 106. In some examples, certain parameters may be automatically identified based on other, previously identified, parameters.

In some examples, the setup procedures of block 402 may include setting up, initiating, and/or calibrating the sensors 104 and/or sensor module 200. In some examples, setting up the sensors 104 may include setting up the technique monitoring system 300 to recognize the position and/or orientation of the welding-type tool 112 based on data detected by one or more sensors 104.

In some examples, setting up the technique monitoring system 300 to recognize the position and/or orientation of the welding-type tool 112 may include identifying a tool model corresponding to the welding-type tool 112. In some examples, the processing circuitry may determine an appropriate tool model to use based on one or more tool parameters entered (e.g., via the monitoring UI 314 and/or module I/O devices 204) and/or determined based on other parameters. In some examples, the technique monitoring system 300 may use the tool model along with (e.g., image) data detected by the sensor(s) 104 to facilitate recognition and/or tracking of the position and/or orientation of the welding-type tool 112. In some examples, the orientation of the welding-type tool 112 may be recorded and/or represented in the form of a tool orientation vector 504 (see, e.g., FIG. 5*b*).

In some examples, the processing circuitry may prompt the operator 110 (e.g., via the monitoring UI 314 and/or module I/O devices 204) to setup the sensor module 200 at block 402. For example, the processing circuitry may prompt the operator 110 to attach the sensor module 200 to the welding-type tool 112 (if not already attached), and/or provide an input (e.g., via the monitoring UI 314 and/or module I/O devices 204) when the attachment is complete. As another example, the processing circuitry may prompt the operator 110 to turn on the sensor module 200 (if not already turned on) or reset the sensor module 200. In some examples, the processing circuitry may prompt the operator 110 to provide an input (e.g., via the monitoring UI 314 and/or module I/O devices 204) when the sensor module 200 has been turned on or reset.

In some examples, the sensor module 200 may set (or reset) an internal reference frame 502 at block 402 (see, e.g., FIG. 5*a*), and save the reference frame 502 in memory. In some examples, the internal reference frame 502 may be set/reset in response to the sensor module 200 being turned on or reset. In some examples, after the sensor module 200 sets, resets, and/or saves its reference frame 502, the sensor module 200 may track changes to its reference frame 502 using the IMU 206. For example, the gyroscope(s) and/or accelerometer(s) of the IMU 206 of the sensor module 200 may detect and/or measure angular motions of the sensor module 200 that may impact the reference frame 502 of the sensor module 200. In some examples, the sensor module 200 may continually update its reference frame 502 based on sensor data from the IMU 206 (and/or other sensors), and/or save the updated reference frame(s) 502 in memory. In such a way, the sensor module 200 may keep track of its own orientation relative to an (e.g., arbitrary) initial orientation. In some examples, the sensor module 200 may keep time-stamped records of its orientation reference frame(s) 502, and/or changes to its orientation reference frame(s) 502, over time.

In some examples, the processing circuitry may additionally prompt the operator 110 (e.g., via the monitoring UI 314 and/or module I/O devices 204) to position the welding-type tool 112 in a particular (e.g., known) orientation at block 402. For example, the processing circuitry may prompt the operator 110 to position the welding-type tool 112 such that a nozzle 299 is pointing down towards the ground in a direction parallel to gravity (and/or parallel to the gravity vector 510; see, e.g., FIG. 5*b*). In such an orientation, an electrode 201 guided by the nozzle 299, and/or other structures within the nozzle 299 (e.g., a contact tip) is also pointing down towards the ground in a direction parallel to gravity. In examples where the welding-type tool 112 does not include a nozzle 299 (e.g., for stick welding and/or SMAW), the processing circuitry may prompt the operator 110 to position the welding-type tool 112 such that the electrode 201 is pointing down towards the ground in a direction parallel to gravity. In some examples, the processing circuitry may prompt the operator 110 (e.g., via the monitoring UI 314 and/or module I/O devices 204) to provide a particular input (e.g., via the monitoring UI 314 and/or module I/O devices 204) when the welding-type tool 112 is positioned in the particular (e.g., known) orientation.

Figures 5A, 5B:
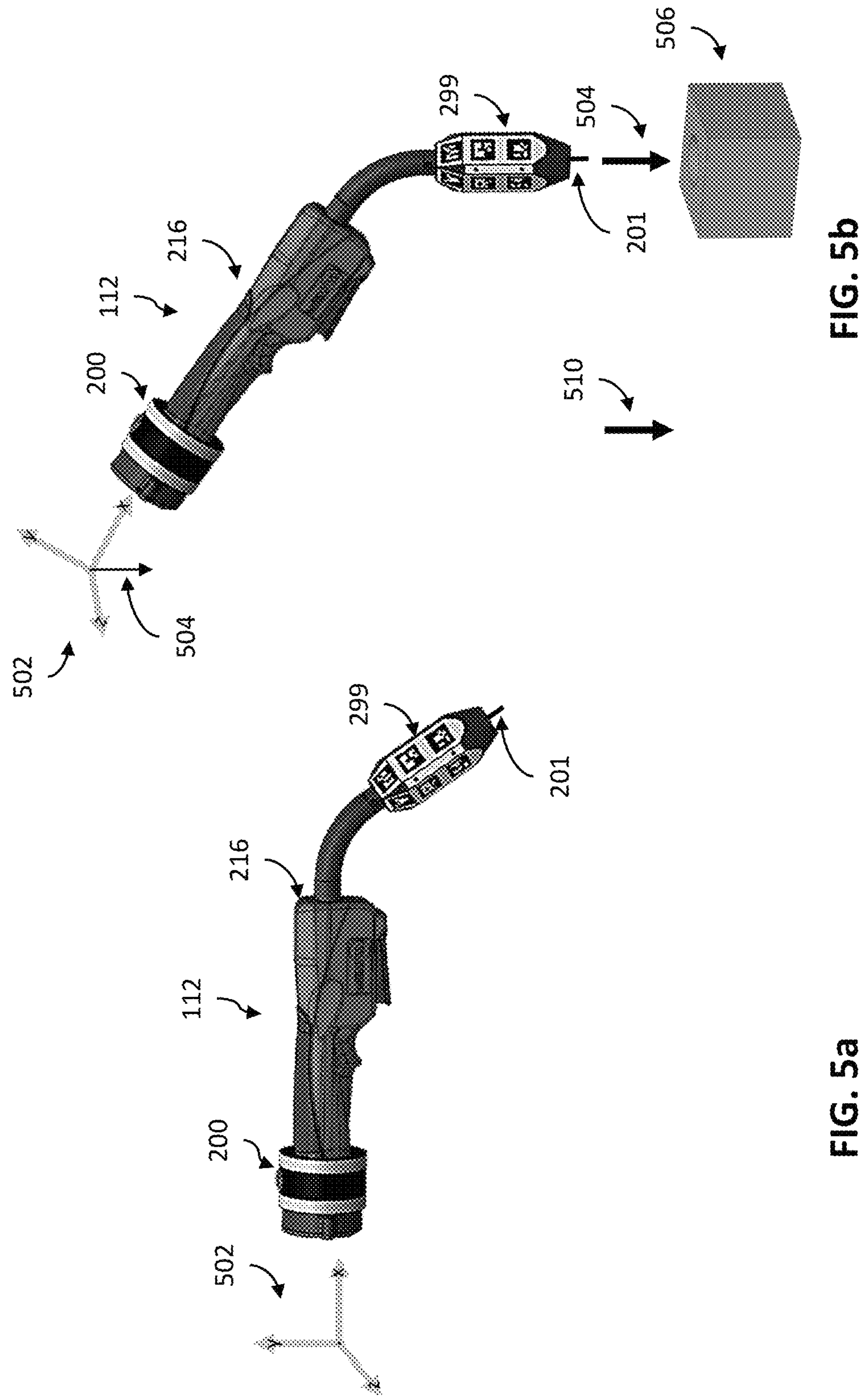
FIG. 5*a* shows an example of an initial reference frame of the sensor module of FIG. 2*a* relative to the welding-type tool of FIG. 2*b* to which the sensor module is attached, in accordance with aspects of this disclosure.
FIG. 5*b* shows an example of the welding-type tool of FIG. 2*b* in a known orientation, such as, for example, to allow a tool orientation vector to be defined relative to the reference frame of the sensor module of FIG. 2*a*, in accordance with aspects of this disclosure.

In response to input indicating the welding-type tool 112 is positioned in the particular (e.g., known) orientation, the processing circuitry may record a tool orientation vector 504 (see, e.g., FIG. 5*b*). In some examples, the tool orientation vector 504 may correspond to a direction parallel to the direction (e.g., an electrode 201 of) the welding-type tool 112 is pointing (e.g., towards a workpiece 122 and/or joint 120). In some examples, the tool orientation vector 504 may correspond to a direction parallel to a longitudinal (and/or traveling) direction of the electrode 201, such as, for example when the electrode is within and/or extending from the nozzle 299.

In some examples, the processing circuitry may record the tool orientation vector 504 relative to the reference frame 502 of the sensor module 200. For example, where the welding-type tool 112 is positioned such that the nozzle 299 (and/or electrode 201) is pointing down towards the ground in a direction parallel to gravity, the processing circuitry may record the tool orientation vector 504 as being parallel to the gravity vector 510. Using the recorded tool orientation vector 504, the sensor module 200 may be able to translate changes in the orientation of its own reference frame 502 (e.g., tracked via the gyroscope(s) and/or accelerometer(s) of the IMU 206) to changes in the orientation of the welding-type tool 112.

FIG. 5*a* shows an example of a reference frame 502 of the sensor module 200 at initiation. As shown, the reference frame 502 is depicted using three arrows intersecting at a point to represent the standard three coordinate axes and (e.g., 0, 0, 0) origin point. In the example of FIG. 5*a*, the reference frame 502 is depicted as being similar to a reference frame of the reader to indicate that the sensor module 200 has just been initiated and has yet to experience any change in orientation (e.g., due to movement of the welding-type tool 102).

The welding technique monitoring system 300 has no information as to the orientation of the welding-type tool 112 when the sensor module is first initiated (e.g., as shown in FIG. 5*a*). However, if an operator 110 positions the welding-type tool 112 in a particular (e.g., known) orientation and provides a corresponding input, as discussed above, the welding technique monitoring system 300 can get information as to the orientation of the welding-type tool 112. FIG. 5*b* shows an example of how the welding-type tool 112 might be positioned at block 402 so that the welding technique monitoring system 300 can get information as to the orientation of the welding-type tool 112.

In the example of FIG. 5*b*, the welding-type tool 112 is positioned with its nozzle 299 and electrode 201 pointing downwards in a direction parallel to gravity (and/or gravity vector 510). A tool orientation vector 504 representative of this orientation is shown extending downwards from the nozzle 299 and electrode 201, also parallel to the direction of gravity (and/or gravity vector 510). FIG. 5*b* also shows the tool orientation vector 504 extending downwards from the origin of the reference frame 502 of the sensor module 200. In some examples, the processing circuitry may record in memory the tool orientation vector 504 in relation to the reference frame 502 of the sensor module 200, and/or record some offset (and/or other information) that allows for a quick determination of the tool orientation vector 504 relative to the reference frame 502 of the sensor module 200.

In some examples, the welding-type tool 112 may be fixed and/or held in the orientation shown in FIG. 5*b* (or some other known orientation) during recordation of the tool orientation vector 504. In some examples, this may be easier if some structure is used to fix the welding-type tool in place and secure against movement. In the example of FIG. 5*b*, a calibration block 506 is shown for this purpose. As shown, the calibration block 506 is depicted below the welding-type tool 112 with a hole sized to snugly fit the nozzle 299 of the welding-type tool 112 and secure the welding-type tool 112 against movement during calibration. In some examples, some other mechanism (e.g., clamp, stand, fixture, fasteners, etc.) may be used to secure the welding-type tool 112 in proper orientation and/or minimize movement during calibration. In some examples, any of the structures described in U.S. patent application No. Ser. 15/004,801, filed Jan. 22, 2016, entitled "Manual Tool Tracking and Guidance With Inertial Measurement Unit," the contents of which are being hereby incorporated by reference in their entirety, may be used to help secure the welding-type tool 112 against movement during calibration and/or recordation of the tool orientation vector 504.

In some examples, once recorded, the tool orientation vector 504 may be used to track the orientation of the welding-type tool 112. As discussed above, the orientation of the reference frame 502 of the sensor module 200 may be tracked using the IMU(s) 206. As the tool orientation vector 504 is recorded in relation to the reference frame 502 of the sensor module 200, tracking of the orientation of the reference frame 502 may allow for tracking of the tool orientation vector 504.

The relationship between the orientation of the welding-type tool 112 and the orientation of the reference frame 502 of the sensor module 200 is exhibited in FIGS. 5*a*-5*b*. As shown, the orientation of the reference frame 502 is different in FIG. 5*a* as compared to FIG. 5*b*. In particular, the reference frame 502 in FIG. 5*b* is shown rotated clockwise with respect to the orientation of the reference frame 502 in FIG. 5*a*. The change in orientation of the reference frame 502 of the sensor module 200 between FIG. 5*a* and FIG. 5*b* is the same as the change in orientation of the welding-type tool 112 between FIG. 5*a* and FIG. 5*b*. Because the sensor module 200 is attached to the welding-type tool 112, the sensor module 200 moves in the same way, and/or rotates to the same degree, as the welding-type tool 112. This similarity of movement allows for tracking the orientation of the welding-type tool 112 (and/or the tool orientation vector 504) by tracking orientation of the sensor module 200 (and/or its reference frame 502); provided the tool orientation vector 504 is properly calibrated and/or recorded with respect to the reference frame 502 of the sensor module 200 at block 402 of the technique monitoring process 400.

In the example of FIG. 4, after block 402, the technique monitoring process 400 proceeds to block 404 where the processing circuitry determines whether a first calibration selection has been received. In some examples, the processing circuitry may prompt the operator 110 for such a calibration selection (e.g., via the monitoring UI 314 and/or module I/O devices 204). In some examples, the calibration selection at block 404 may indicate that the welding-type tool 112 is oriented properly for calibration of a first joint characteristic vector (and/or first joint characteristic plane). In some examples, the prompt may indicate the proper orientation for calibration of the first joint characteristic vector (and/or first joint characteristic plane).

In the example of FIG. 4, the technique monitoring process 400 repeats block 404 until a first calibration selection is received. As shown, after a first calibration selection is received at block 404, the technique monitoring process 400 proceeds to block 406. At block 406, the processing circuitry identifies (and/or records in memory) the first joint characteristic vector (and/or plane).

In some examples, the first joint characteristic vector is a vector that is perpendicular to the major workpiece (e.g., base plate workpiece 122*a*). Such a vector may be referred to as a base plate perpendicular vector 602. In some examples, the first joint characteristic plane is a plane that is perpendicular to the first joint characteristic vector. In some examples where the first joint characteristic vector is a base plate perpendicular vector 602, the first joint characteristic plane is a plane perpendicular to the base plate perpendicular vector 602 (and/or parallel to the base plate workpiece 122*a*). Such a plane may be referred to as a base plate surface plane 604.

Figure 6A:
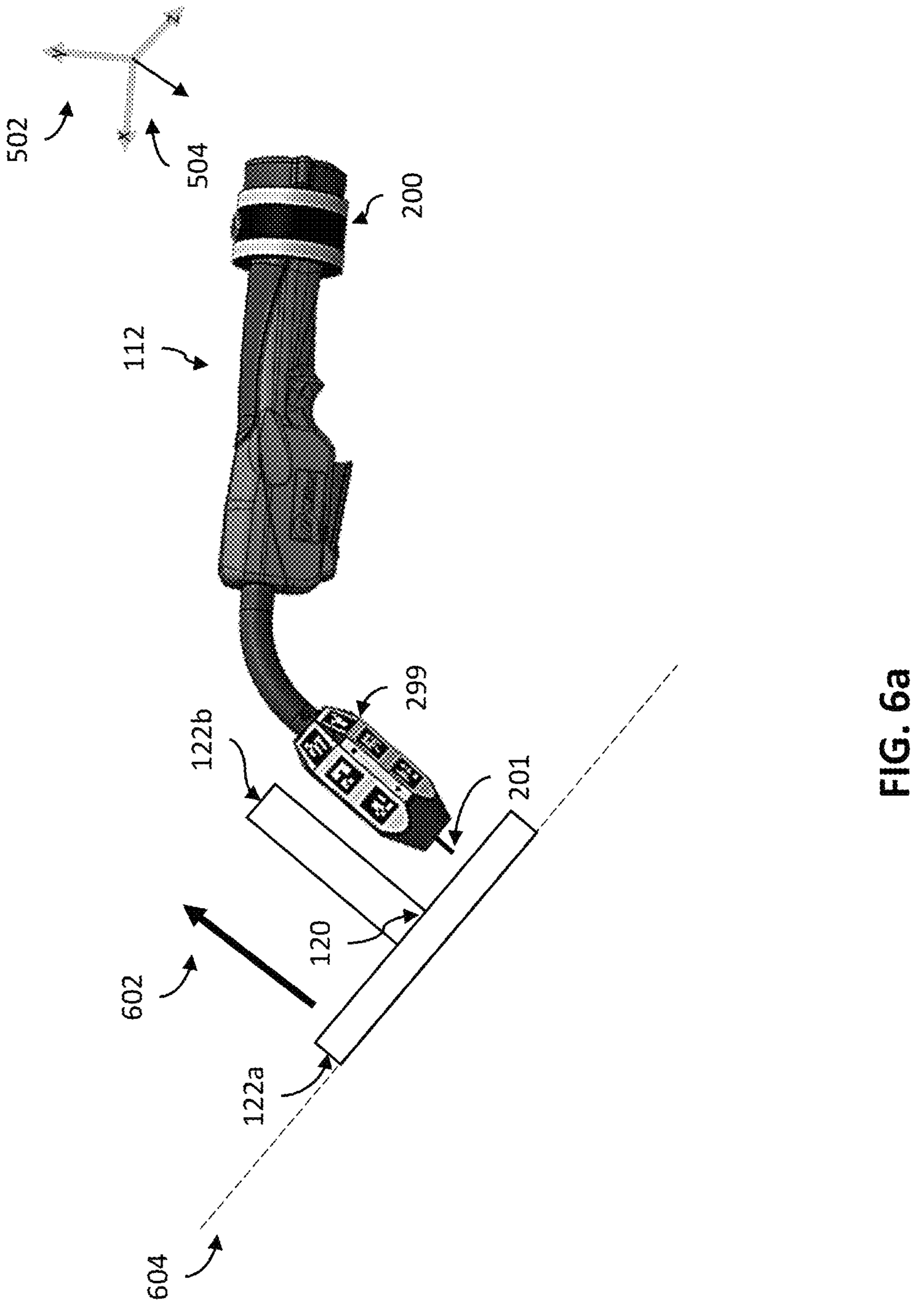
FIGS. 6*a*-6*c* are diagrams showing examples of how the welding-type tool of FIG. 2*b* might be oriented with respect to a workpiece during calibration, in accordance with aspects of this disclosure.
Figure 6B:
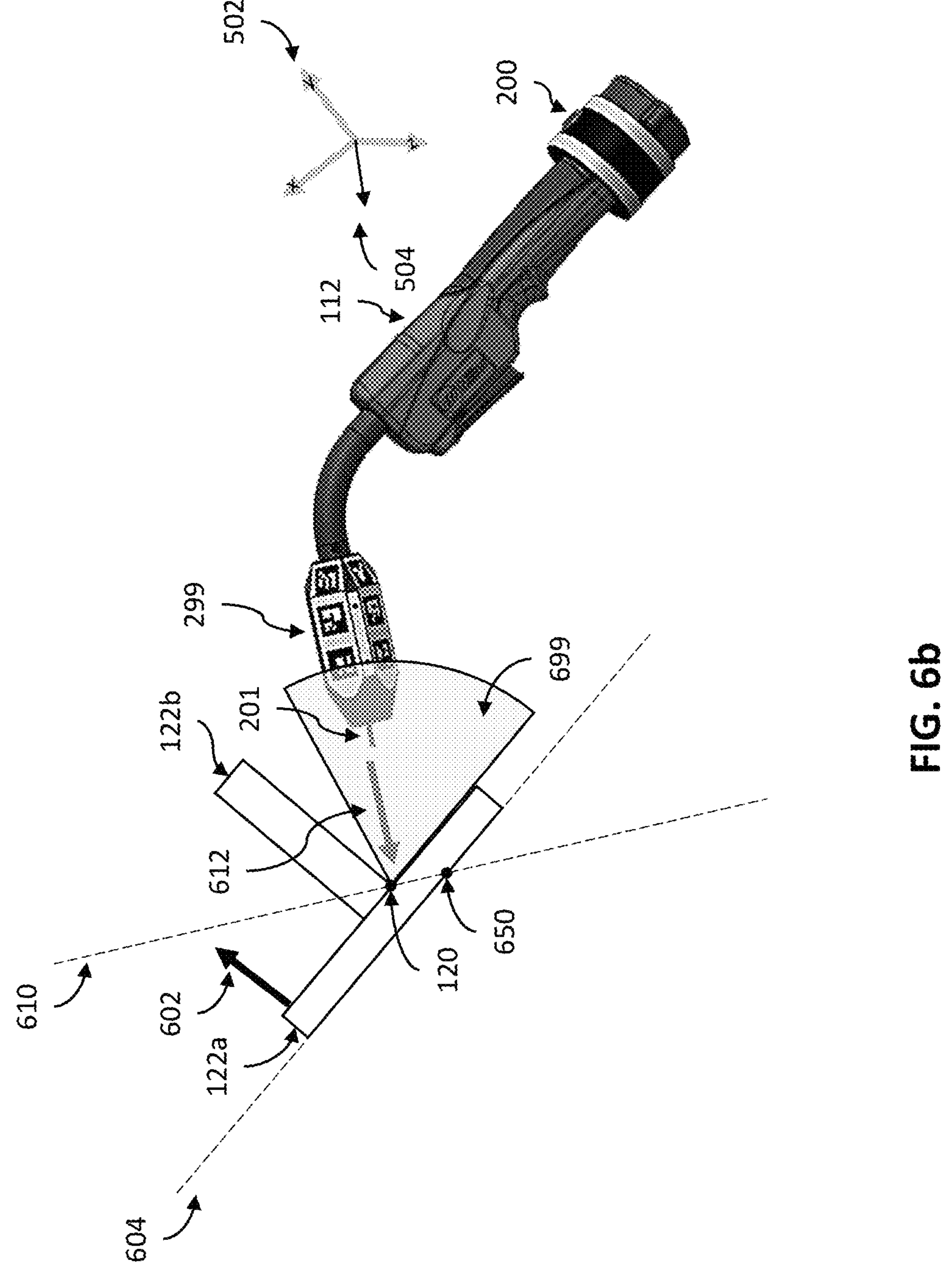
Figure 6C:
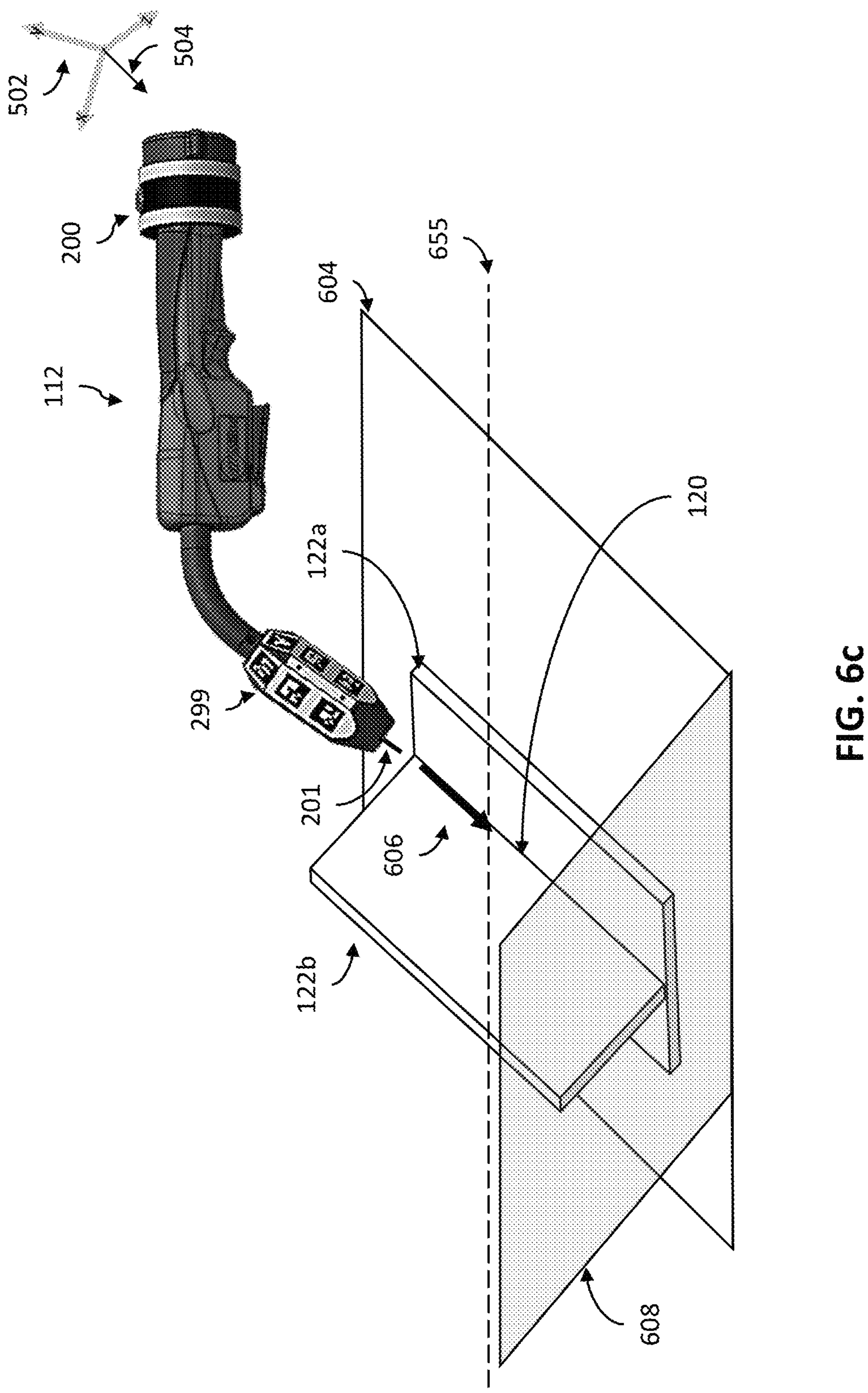

FIG. 6*a* shows an example of the base plate perpendicular vector 602 and/or base plate surface plane 604. In FIG. 6*a*, the viewpoint is from the perspective of a viewer looking along the joint 120 from a position at an end of the workpieces 122 (e.g., as the joint 120 is going into, or coming out of, the page). From such a viewpoint, the joint 120 appears (and is shown in FIG. 6*a*) as a point at the intersection of the workpieces 122. From the viewpoint perspective of FIG. 6*a*, the workpieces 122 appear as 2D (rather than 3D) structures, and the base plate surface plane 604 appears as a 2D line (rather than a 3D plane). FIG. 6*c* shows a different viewpoint where the workpieces 122 appear as 3D (rather than 2D) structures, and the base plate surface plane 604 appears as a 3D plane (rather than a 2D line).

In some examples, the orientation of the welding-type tool 112 shown in FIG. 6*a* may be the proper orientation of the welding-type tool 112 for calibration of the base plate perpendicular vector 602 (and/or base plate surface plane 604) as the first joint characteristic vector (and/or plane) at blocks 404-406. In the example of FIG. 6*a*, the welding-type tool is at an orientation where the electrode 201 (and/or tool orientation vector 504) is pointed perpendicular to the base plate workpiece 122*a*; or as close to perpendicular as the operator 110 can manage. In some examples (e.g., where there is no stickout of the electrode 201 from the nozzle 299), an operator 110 may place the nozzle 299 of the welding-type tool 112 flush against the base plate workpiece 122 to properly orient the welding-type tool 112 perpendicular to the base plate workpiece 122*a*.

In some examples, the first joint characteristic vector calibrated at blocks 404-406 may instead be a vector that is a parallel to the joint 120 that is to be operated upon. Such a vector may be referred to as a joint orientation vector 606. In some examples where the first joint characteristic vector is the joint orientation vector 606, the first joint characteristic plane is a plane perpendicular to the joint orientation vector 606. Such a plane may be referred to as a joint perpendicular plane 608.

FIG. 6*c* shows an example of the joint orientation vector 606 and/or joint perpendicular plane 608. In some examples, the orientation of the welding-type tool 112 shown in FIG. 6*c* may be the proper orientation for calibration of the joint orientation vector 606 (and/or joint perpendicular plane 608) as the first joint characteristic vector (and/or plane) at blocks 404-406. As shown, the welding-type tool 112 is oriented such that the electrode 201 (and/or tool orientation vector 504) is pointed parallel to the joint 120; or as close to parallel as the operator 110 can manage. In some examples, the welding-type tool 112 may additionally be oriented such that the electrode 201 (and/or tool orientation vector 504) is pointed in the intended travel direction of the welding-type operation.

In some examples, the first joint characteristic plane may instead be a plane that includes at least one vector, and/or a plurality of vectors (and/or an infinite number of vectors) that is/are parallel to the joint 120. Such a plane may be referred to as a joint parallel plane 610. FIG. 6*b* shows an example of a joint parallel plane 610. As the viewpoint perspective of FIG. 6*b* is similar to that of FIG. 6*a*, the joint 120 in FIG. 6*b* is shown as a point at the intersection of the workpieces 122, and the joint parallel plane 610 is shown as a straight line (rather than a 3D plane) that intersects the joint 120.

In some examples, the orientation of the welding-type tool 112 shown in FIG. 6*b* may be the proper orientation for calibration of the joint parallel plane 610 as the first joint characteristic plane at blocks 404-406. While not considered a first or second joint characteristic vector, a joint perpendicular vector 612 (parallel to the tool orientation vector 504 and perpendicular to the joint 120) may nevertheless also be recorded at blocks 404-406 when the welding-type tool 112 is oriented as shown in FIG. 6*b*. In the example of FIG. 6*b*, the welding-type tool 112 is oriented such that the electrode 201 (and/or tool orientation vector 504) is oriented perpendicular to the joint 120, but not perpendicular to the base plate workpiece 122*a* (and thus not parallel to a base plate perpendicular vector 602).

In some examples, proper orientation for calibration for the joint parallel plane 610 may require the welding-type tool 112 be oriented such that the electrode 201 (and/or tool orientation vector 504) is offset from parallelism with the base plate perpendicular vector 602 (and/or offset from perpendicularity with the base plate workpiece 122*a*) by at least a threshold amount (e.g., 22.5 degrees). In some examples, this threshold offset may be necessary to avoid potential cross product errors (and/or uncertainties) that can occur when two vectors are closely aligned. FIG. 6*b* shows an example angle range 699 within which the welding-type tool 112 might still be considered properly oriented for calibration of the joint parallel plane 610. In some examples, the processing circuitry may provide a notification (e.g., via the monitoring UI 314 and/or module I/O devices 204) informing the operator 110 if the welding-type tool 112 is not properly oriented (e.g., outside of the angle range 699), and/or return to block 404.

In some examples, the processing circuitry may use data from the sensors 104 and/or sensor module 200 to identify the real time orientation of the welding-type tool 112 (e.g., tool orientation vector 504) and use that orientation to identify the first joint characteristic vector (and/or first joint characteristic plane) at block 406. For example, the processing circuitry may use the tool orientation vector 504 to identify the base plate perpendicular vector 602 and/or the base plate surface plane 604. As discussed above, when the welding-type tool 112 is properly oriented for calibration of the base plate perpendicular vector 602 and/or the base plate surface plane 604, the tool orientation vector 504 is oriented perpendicular to the base plate workpiece 122*a*, as shown in FIG. 6*a*. Thus, the processing circuitry may identify the base plate perpendicular vector 602 as being parallel to the tool orientation vector 504, and/or identify the base plate surface plane 604 as being perpendicular to the tool orientation vector 504 at block 406, when the welding-type tool 112 is properly oriented.

As another example, the processing circuitry may use the tool orientation vector 504 to identify the joint orientation vector 606 and/or joint perpendicular plane 608. As discussed above, when the welding-type tool 112 is properly oriented for calibration of the joint orientation vector 606 and/or joint perpendicular plane 608, the tool orientation vector 504 is oriented parallel to the joint 120, as shown in FIG. 6*c*. Thus, the processing circuitry may identify the joint orientation vector 606 as being parallel to the tool orientation vector 504, and/or identify the joint perpendicular plane 608 as being perpendicular to the tool orientation vector 504 at block 406, when the welding-type tool 112 is properly oriented. Additionally, the processing circuitry may identify the travel direction as being in the same direction as the tool orientation vector 504.

As another example, the processing circuitry may use the tool orientation vector 504 to identify the joint perpendicular vector 612 and/or the joint parallel plane 610. As discussed above, when the welding-type tool 112 is properly oriented for calibration of the joint parallel plane 610 (and/or joint perpendicular vector 612), the tool orientation vector 504 is oriented perpendicular to the joint 120. Thus, the processing circuitry may identify the joint perpendicular vector 612 as being parallel to the tool orientation vector 504, and/or identify the joint parallel plane 610 as being perpendicular to the tool orientation vector 504 at block 406, when the welding-type tool 112 is properly oriented.

In some examples, the processing circuitry may record the first joint characteristic vector and/or first joint characteristic plane in memory at block 406. In some examples, the first joint characteristic vector and/or first joint characteristic plane may be recorded independent of the sensor reference frame 502, such that subsequent manipulations of the welding-type tool 112 that might impact the sensor reference frame 502 will not impact the recorded first joint characteristic vector and/or first joint characteristic plane. In some examples, the processing circuitry may also record in memory the instantaneous values (and/or representations) of the reference frame 502, gravity vector 510, and tool orientation vector 504 in response to the calibration selection at blocks 404-406, to facilitate recording of the first joint characteristic vector (and/or plane).

In the example of FIG. 4, the technique monitoring process 400 proceeds from block 406 to block 408, where the processing circuitry determines whether a second calibration selection has been received, similar to that described above with respect to block 404. In some examples, the processing circuitry may prompt the operator 110 for such a calibration selection, and/or indicate the proper orientation for calibration of a second joint characteristic vector (and/or second joint characteristic plane). In some examples, the calibration selection at block 408 may indicate that the welding-type tool 112 is oriented properly for calibration of the second joint characteristic vector (and/or second joint characteristic plane).

In the example of FIG. 4, the technique monitoring process 400 repeats block 408 until a second calibration selection is received. As shown, after a second calibration selection is received at block 408, the technique monitoring process 400 proceeds to block 410. At block 410, the processing circuitry identifies (and/or records in memory) the second characteristic vector (and/or plane).

In some examples, proper orientation of the welding-type tool 112 for calibration of the second joint characteristic vector (and/or second joint characteristic plane) may correspond to one of the orientations previously discussed above with respect to FIGS. 6*a*-6*c*. For example, FIG. 6*a* may depict proper orientation of the welding-type tool 112 for calibration of the base plate perpendicular vector 602 (and/or base plate surface plane 604) as the second joint characteristic vector (and/or plane) at blocks 408-410. As another example, FIG. 6*b* may depict proper orientation of the welding-type tool 112 for calibration of the joint parallel plane 610 as the second joint characteristic plane (and/or calibration of the joint perpendicular vector 612 as an intermediate vector) at blocks 408-410. As another example, FIG. 6*c* may depict proper orientation of the welding-type tool 112 for calibration of the joint orientation vector 606 and and/or joint perpendicular plane 608 at blocks 408-410.

In some examples, the processing circuitry may use data from the sensors 104 and/or sensor module 200 to identify the real time orientation of the welding-type tool 112 (e.g., tool orientation vector 504) and use that orientation to identify the second joint characteristic vector (and/or plane) at block 410, similar to that which is discussed above with respect to block 406. In some examples, the second joint characteristic vector and/or second joint characteristic plane may be recorded independent of the sensor reference frame 502, such that subsequent manipulations of the welding-type tool 112 that might impact the sensor reference frame 502 will not impact the recorded second joint characteristic vector and/or second joint characteristic plane. In some examples, the processing circuitry may also record in memory the instantaneous values (and/or representations) of the reference frame 502, gravity vector 510, and tool orientation vector 504 in response to the calibration selection at blocks 408-410, to facilitate recording of the first joint characteristic vector (and/or plane).

In some examples, the second joint characteristic vector (and/or plane) is a different one of the previously discussed vectors (and/or planes) than the first joint characteristic vector and/or plane. For example, where the first joint characteristic vector is the joint orientation vector 606 and/or joint perpendicular plane 608, the second joint characteristic vector and/or plane may be the base plate perpendicular vector 602 and/or base plate surface plane 604. As another example, where the first joint characteristic vector and/or plane is the base plate perpendicular vector 602 and/or base plate surface plane 604, the second joint characteristic vector and/or plane may be the joint orientation vector 606 and/or joint perpendicular plane 608, or the joint parallel plane 610.

In some examples, the processing circuitry may additionally use the first joint characteristic (and/or plane) to identify the second joint characteristic vector (and/or plane) at block 410. In some examples, an intermediate (e.g., neither first nor second) vector may also be determined at block 410 and/or used to identify the second joint characteristic vector (and/or plane).

For example, where the first joint characteristic vector is the base plate perpendicular vector 602 (e.g., shown in FIG. 6*a*), and the intermediate vector (identified at block 410) is the joint perpendicular vector 612, the second joint characteristic vector may be the joint orientation vector 606. In such an example, the joint orientation vector 606 may be determined as the cross product of the first joint characteristic vector (i.e., the base plate perpendicular vector 602) and the intermediate vector (i.e., the joint perpendicular vector 612). In such an example, the joint orientation vector 606 may be perpendicular to both the first joint characteristic vector (i.e., the base plate perpendicular vector 602) and the intermediate vector (i.e., the joint perpendicular vector 612).

Alternatively, in the above example, the joint orientation vector 606 may be determined as being parallel to the intersection 650 of the first joint characteristic plane (i.e., the joint parallel plane 610, shown in FIG. 6*b*) and the second joint characteristic plane (i.e., the base plate surface plane 604, shown in FIGS. 6*a*-6*b*). In some examples, the joint parallel plane 610 and base plate surface plane 604 will intersect along a vector that is parallel to the joint orientation vector 606.

In FIG. 6*b*, both the joint 120 and the intersection 650 of the joint parallel plane 610 and base plate surface plane 604 are shown as points (rather than lines/vectors) due to the viewpoint perspective of FIG. 6*b* (as discussed above). Were the base plate surface plane 604 moved so that the plane 604 was collinear with the upper edge of the workpiece 122*a* (rather than the lower edge as depicted currently), the joint parallel plane 610 and base plate surface plane 604 would intersect at the joint 120.

In some examples, both the first and second joint characteristic vectors may be identified at block 410. For example, in a reverse to the example above, where the first joint plane is the joint parallel plane 610, the intermediate vector (identified at block 410) is the joint perpendicular vector 612, and the second joint characteristic vector and/or plane is the base plate perpendicular vector 602 and/or base plate surface plane 604, the first joint characteristic vector (i.e., the joint orientation vector 606) may only be determined once the second joint characteristic vector/plane is known. Thereafter, the joint orientation vector 606 may be determined as the cross product of the joint perpendicular vector 612 (i.e., intermediate vector) and the base plate perpendicular vector 602 (i.e., second joint characteristic vector), or the intersection of the base plate surface plane 604 (i.e., first joint characteristic plane) and the joint parallel plane 610 (i.e., second joint characteristic plane), as discussed above.

While described and shown in FIG. 4 as involving two distinct calibration steps, in some examples, the calibrations of blocks 404-410 may occur with one smooth calibration movement. For example, an operator 110 may first positon the welding-type tool as appropriate when providing the first calibration input at block 404 (as discussed above), and then move the welding-type tool 112 until the welding-type tool is appropriately positioned for the second calibration input (at block 408). In such an example, the operator 110 may provide the first calibration input during the entire movement, or may provide the first calibration input at the beginning of the movement, and the second calibration input at the end of the movement. Alternatively, the operator 110 may provide the first calibration input when the welding-type tool 112 is in the proper first position, and then the processing circuitry may wait a threshold amount of time before automatically considering the movement to have ended (e.g., as if the second calibration input had been provided).

In some examples, the monitoring system 300 may use the tool orientation vector 504 at the start and end of the movement to determine the first and second joint characteristic vectors (and/or planes). In some examples, the monitoring system 300 may combine a plurality of tool orientation vectors 504 (e.g. identified over the course of the movement when the welding-type tool is in one or more acceptable positions) using a statistical algorithm (e.g., average, mode, etc.). In some examples, the processing circuitry may require that the movement be along and/or within a single plane (and/or within a certain threshold of the plane), and/or output an error and/or return to block 404 if not.

In the example of FIG. 4, the technique monitoring process 400 proceeds from block 410 to block 412, where the processing circuitry determines a slope of the joint 120 (and/or workpiece(s) 122). For example, the processing circuitry may calculate an angle between a horizontal plane/vector 655 and the joint orientation vector 606, and identify the slope as (and/or based on) that angle (see, e.g., FIG. 6*c*). As another example, the processing circuitry may calculate an angle between the horizontal plane/vector 655 and the base plate surface plane 604, and identify the slope as (and/or based on) that angle (see, e.g., FIG. 6*c*). In some examples, the processing circuitry may identify the horizontal plane/vector 655 based on the gravity vector 510 (e.g., 90 degrees+/−the gravity vector 510). While shown as being identified after both the first and second joint characteristic vectors/planes, in some examples, the slope of the joint 120 (and/or workpiece(s) 122) may be determined (and/or output) as soon as the joint orientation vector 606 (or base plate surface plane 604) is identified.

In the example of FIG. 4, the technique monitoring process 400 proceeds from block 412 to block 414, where the processing circuitry determines an intended travel direction for the welding-type operation. In some examples, the intended travel direction may be determined based on the first or second joint characteristic vector. For example, where the first/second joint characteristic vector is the joint orientation vector 606, and is identified as being parallel to the tool orientation vector 504 (e.g., as shown in FIG. 6*c*), the intended travel direction may be identified as being in the same direction as the tool orientation vector 504. In some examples, the intended travel direction may be determined based on user input (e.g., received via the monitoring UI 314 and/or module I/O devices 204). In some examples, movement of the welding-type tool 112 in a direction parallel to the joint orientation vector 606 (e.g., at block 416) may be considered movement in an intended travel direction.

In the example of FIG. 4, after block 414, the technique monitoring process 400 proceeds to block 416, where the processing circuitry tracks the orientation and/or movement of the welding-type tool 112 using data from the sensor module 200 and/or sensor(s) 104. In some examples, the rotational orientation of the welding-type tool 112 may be tracked in real time using the sensor(s) 104, tool orientation vector 504, and/or relevant rigid body model, as discussed above. In some examples, the rotational orientation of the welding-type tool 112 may be tracked in real time using the sensor reference frame 502, tool orientation vector 504, and IMU 206, as discussed above. In some examples, the linear movements (e.g., speed and direction) of the welding-type tool 112 may also be tracked, such as, for example, by analyzing linear acceleration measurements of the accelerometer(s) of the IMU 206. In some examples, movement of the welding-type tool 112 in the base plate surface plane 604 may be analyzed to determine weave pattern characteristics (e.g., frequency, weave width, dwell time, etc.).

In the example of FIG. 4, after block 416, the technique monitoring process 400 proceeds to block 418, where the processing circuitry determines (e.g., real time) welding technique parameters based on the tracked orientation(s) and/or movement(s) of the welding-type tool 112 and the first and/or second joint characteristic vectors. For example, the processing circuitry may determine travel angle and/or work angle based on the tracked orientation(s) and/or movement(s) of the welding-type tool 112 and the first and/or second joint characteristic vectors. In some examples, travel angle may be defined as the angle of the welding-type tool 112 with respect to a direction that a welding-type operation progresses (e.g., where a perpendicular angle is a zero degree travel angle). Thus, in some examples, the processing circuitry may determine the travel angle based on the angle between the joint orientation vector 606 and the tool orientation vector 504 (and/or 90 degrees minus this angle).

In some examples, work angle may be defined as the angle between a line perpendicular to the major workpiece (e.g., base plate workpiece 122*a*) and a plane determined by the electrode axis (e.g., tool orientation vector 504) and the weld axis (e.g., joint orientation vector 606). Thus, in some examples, the technique monitoring process 400 may determine the work angle based on the base plate perpendicular vector 602 and the tool orientation vector 504 (e.g., where the tool orientation vector 504 is assumed to be the relevant line on the plane). In some examples, precise calculations of travel angle and/or work angle may rely on both an angle between the tool orientation vector 504 and the joint orientation vector 606, and an angle between the tool orientation vector 504 and the base plate perpendicular vector 602 (e.g., applied to certain trigonometric functions).

In examples where travel angle is determined, the technique monitoring process 400 may use the travel direction in conjunction with travel angle to determine whether welding-type operation is a push or drag operation (e.g., based on whether tool orientation vector 504 and travel direction are in the same, or a different, direction). In some examples, a positive travel angle may be considered a push, while a negative travel angle is considered a drag.

In the example of FIG. 4, after block 418, the technique monitoring process 400 proceeds to block 420, where the processing circuitry provides real time feedback. In some examples, the real time feedback may be provided to the operator 110 via the monitoring UI 314 and/or module I/O devices 204. In some examples, the feedback may be in the form of one or more text messages, images, videos, sounds, vibrations, and/or appropriate outputs. In some examples, the feedback may identify one or more of the welding technique parameter values and/or weave pattern characteristics determined at block 418. In some examples, the feedback may identify one or more welding, sensor, and/or operation parameter values.

In some examples, the feedback may be with respect to that particular instantaneous moment in time, and/or with respect to a given time period. In some examples, the processing circuitry may compare the determined parameter values (and/or weave pattern characteristic values) to expected and/or target welding technique parameter (and/or weave pattern characteristic) values, and/or provide feedback regarding the comparison. In some examples, the technique monitoring process 400 might provide different feedback (e.g., red vs. green colors, chime vs. alarm sounds, etc.) depending on whether the determined values are within, or outside of, a threshold range of the expected/target values. In some examples, the processing circuitry may further determine one or more ratings, grades, and/or scores based on the comparison of the determined values to the expected/target values, and provide feedback with respect thereto.

In some examples, the processing circuitry may further record in memory and/or transmit (e.g., to a remote server) parameter/characteristic values, and/or relative feedback. For example, the processing circuitry may send the information to the welding equipment 106. In some examples, the welding equipment 106 may use the information to adjust welding parameters. In some examples, the processing circuitry may disable the welding equipment 106, send a message to a supervisor, lock the workpiece(s) 122 (e.g., via a clamp or fixture), and/or take other appropriate action in response to a technique grade, rating, and/or score below a threshold (e.g., stored in memory).

In some examples, the processing circuitry may further track when a (e.g., live or simulated) welding-type operation is occurring (e.g., via measurements of the current sensor 208, communication with the welding helmet 108, and/or communication with welding equipment 106) and use this information when determining, and/or providing feedback regarding, parameter/characteristic values. For example, the processing circuitry may only determine technique data and/or weave pattern characteristics when a welding-type operation is occurring. As another example, the processing circuitry may only provide feedback and/or determine a grade, rating, and/or score when an actual (or simulated) welding-type operation is occurring. As another example, the processing circuitry may record and/or output information about whether the welding-type operation is occurring when recording and/or outputting the technique data and/or weave pattern characteristics (and/or associated feedback).

In the example of FIG. 4, the processing circuitry may continue the tracking, technique parameter calculations, and/or feedback of blocks 416-420 unless or until there is a change in the sensor module 200 (e.g., block 422) and/or the joint 120 (e.g., block 424). As shown, in the absence of such a change, the processing circuitry may determine the same information still applies, allowing the technique monitoring process 400 to return to block 416, and repeat blocks 416-420. Though not shown, in some examples, the technique monitoring process 400 may be terminated at any time by appropriate input from the operator 110.

In the example of FIG. 4, at block 422, the processing circuitry checks to see if there has been a change in the sensor(s) 104 and/or sensor module 200 that warrants recalibration. In some examples, such a change may be determined to occur if there has been more than a threshold amount drift of one or more of the sensors 104 and/or sensors of the IMU 206. In some examples where multiple IMUs 206 are used, such a change may be determined to occur if there has been more than a threshold amount drift of one or more sensors of more than a threshold number of the IMUs 206. In some examples, a change warranting recalibration may be determined to occur if more than a threshold amount of time has passed since the sensor(s) 104 and/or sensor module 200 was set and/or reset at block 402 (or joint calibration performed at blocks 406 and/or 410), which might be correlated with substantial drift. As shown, the technique monitoring process 400 returns to block 402 after block 422 if there has been a change that warrants sensor recalibration, and proceeds to block 424 if there has not been a change that warrants sensor recalibration.

In the example of FIG. 4, the processing circuitry checks whether there has been a significant enough change in the joint 120 to warrant recalibration at block 424. In some examples, the technique monitoring process 400 may rely on the operator 110 to provide this information (e.g., via the monitoring UI 314 and/or module I/O devices 204). For example, if the operator 110 finishes one welding-type operation, and is set to begin a different welding-type operation with one or more different workpieces 122 and/or one or more different joints 120, then the operator 110 may provide an input to let the processing circuitry know that the prior joint calibrations are no longer applicable. In such an example, the technique monitoring process 400 would begin again at block 404. However, if, for example, the operator 110 is continuing with the same welding-type operation, or even starting a new welding-type operation where the joint 120 is in the same position and oriented the same way as the previous welding-type operation, then the technique monitoring process 400 may continue to block 416 with no additional calibrations necessary.

Figures 7A, 7B:
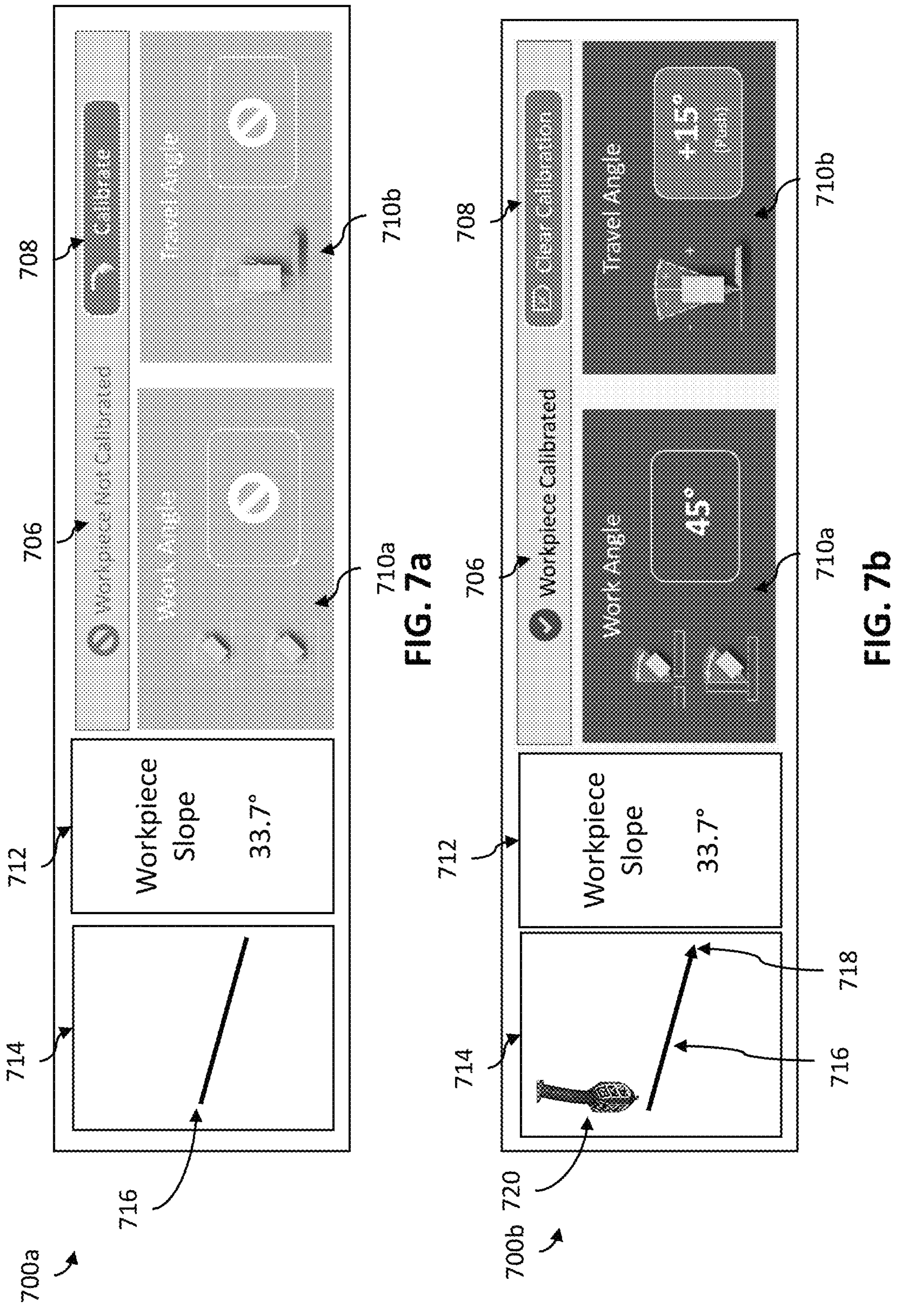
FIGS. 7*a*-7*b* show example graphical user interfaces (GUIs) that might be shown during the technique monitoring process of FIG. 4, in accordance with aspects of this disclosure.

FIGS. 7*a*-7*b* show examples of graphical user interfaces (GUIs) 700 that might be shown during the technique monitoring process 400 via the display screen(s) of the module I/O devices 204 and/or monitoring UI 314. In the example of FIGS. 7*a*-7*b*, the GUIs 700 show a calibration status message 706 next to a calibration button 708. In the GUI 700*a* of FIG. 7*a*, the calibration status message 706 indicates that the welding technique monitoring system 300 has yet to be fully calibrated with information regarding the workpiece 122 and/or joint 120 (e.g., the joint characteristic vectors). The calibration button 708 next to the calibration status message 706 provides a means through which an operator 110 could provide an input to induce full calibration (e.g., at blocks 404 and/or 408).

In the examples of FIGS. 7*a*-7*b*, each GUI 700 provides two feedback outputs 710: a work angle feedback output 710*a*, and a travel angle feedback output 710*b*. However, in the GUI 700*a* of FIG. 7*a*, the feedback outputs 710 are shown grayed out with a prohibition symbol to indicate that the monitoring system 300 cannot presently provide feedback (e.g., because the technique monitoring system 300 has not yet been fully calibrated).

Despite the lack of full calibration, the GUI 700*a* in FIG. 7*a* shows a slope message 712 indicating that the slope of the workpiece(s) 122 (and/or joint 120) is 33.7 degrees. The slope message 712 in GUI 700*a* of FIG. 7*a* illustrates the ability of the monitoring system 300 to sometimes determine and display the slope prior to full calibration of both joint characteristic vectors, as long as at least the first joint characteristic vector has been calibrated, as discussed above. The same slope message 712 continues to be shown in the GUI 700*b* in FIG. 7*b* after full calibration of both the first and second joint characteristic vectors.

In the example of FIGS. 7*a*-7*b*, the GUIs 700 also include a joint feedback output 714. In the example of FIG. 7*a*, the joint feedback output 714 depicts a line 716 at a slope that is in accordance with the slope indicated in the slope message 712. Thus, the joint feedback output 714 shows a simple preview of the slope of the joint 120 (and/or workpieces 122) which may help an operator 110 when planning execution of the welding operation.

In the GUI 700*b* of FIG. 7*b*, the joint feedback output 714 additionally shows an arrowhead 718 at the end of the line 716, indicating intended travel direction (e.g., as determined at block 414). In the example of FIG. 7*b*, the joint feedback output 714 further shows a tool image 720 at one end of the line 716, indicating where an operator 110 should initially position the tool for a welding-type operation along the join in the intended travel direction. In some examples, the joint feedback output 714 might show the tool image 720 (and/or arrowhead 718) at the opposite end of the line if the intended travel direction were in the opposite direction. In some examples, the orientation of the tool image 720 relative to the line 716 may also be modified to depict the identified work angle and/or travel angle shown in the feedback outputs 710.

In the GUI 700*b* of FIG. 7*b*, the calibration status message 706 indicates that the welding technique monitoring system 300 has been fully calibrated to be able to recognize both joint characteristic vectors. The calibration button 708 next to the calibration status message 706 provides an input through which an operator 110 could clear the current calibration, such as if, for example, the operator 110 was starting a new welding-type operation with a different joint 120 (e.g., block 424). In the GUI 700*b* shown in FIG. 7*b*, both feedback outputs 710 show values detected/determined during the technique monitoring process 400, as made possible by calibration during the technique monitoring process 400. Additionally, the feedback output 710*b* provides feedback that the welding-type operation is a push (rather than pull) operation.

While described as feedback outputs 710, in some examples, the feedback outputs 710 may alternatively, or additionally, be means through which input can be provided. For example, selection of the feedback outputs 710 may change the format of the feedback being output (e.g., from numerical, to chart/graph, to numerical and chart/graph, etc.). While only travel angle and weld angle are shown in the feedback outputs 710, in some examples other parameter values (and/or weave pattern characteristic values) may be shown. While not shown, in some examples, the calibration status message 706 might also indicate a threshold amount of time had passed since calibration, indicate a time until such a threshold would pass, and/or indicate a confidence level of the feedback given the time since calibration (e.g., due to drift of the IMU 206).

Figure 8:
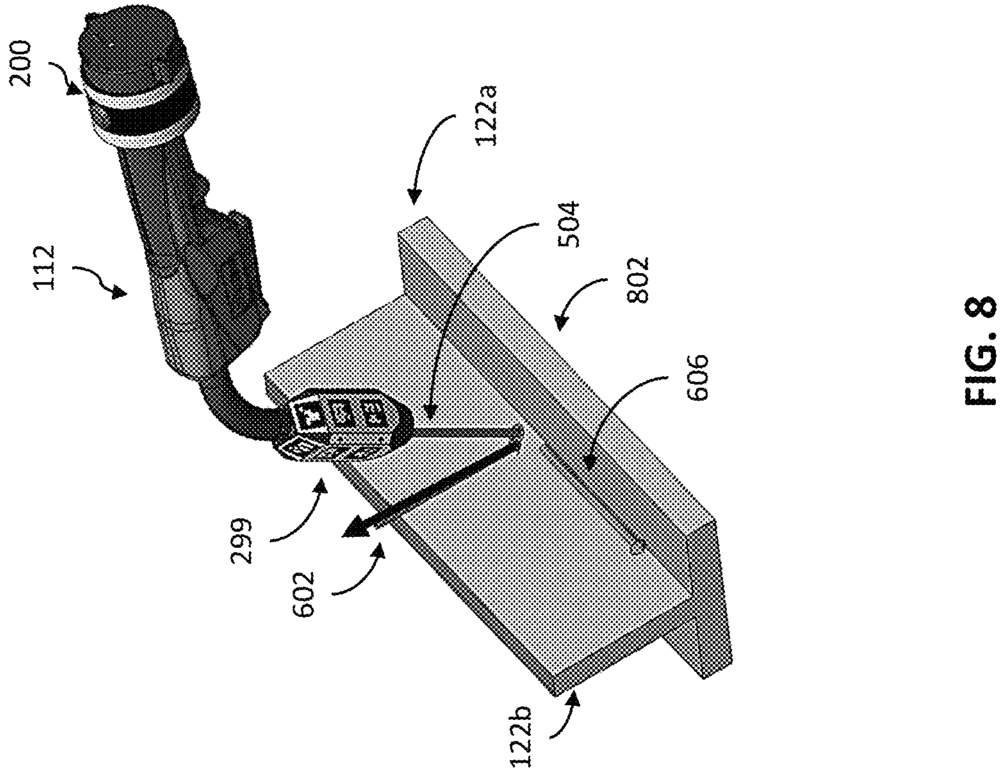
FIG. 8 shows an example of the welding-type tool of FIG. 2*b* performing a welding operation on a joint of a workpiece, and how several vectors that might be used during the technique monitoring process of FIG. 4 relate to the joint, in accordance with aspects of this disclosure.

FIG. 8 shows an example of the welding-type tool 112 positioned for a welding-type operation after full calibration of the monitoring system 300. As shown, the welding-type tool 112 is positioned for operation on a sloped fillet T joint 120 between two workpieces 122. The calibrated base plate perpendicular vector 602 and joint orientation vector 606 are also shown in relation to the tool orientation vector 504. As shown, the tool orientation vector 504 forms an angle with respect each of the base plate perpendicular vector 602 and joint orientation vector 606. In some examples, these angle may be used as inputs for various trigonometric functions, which may be used to determine various welding technique parameters (e.g., travel angle and/or work angle). The monitoring system 300 may then provide real-time feedback to the operator 110 regarding the welding technique parameters, which may help the operator 110 understand what they are doing well and/or wrong, and make adjustments as needed.

The example tool based welding technique monitoring system 300 provides an inexpensive, robust, and potentially portable solution for tracking an orientation of a welding-type tool 112, and providing feedback as to welding technique. In some cases, the system 300 may require no sensors apart from a simple and/or relatively inexpensive sensor module 200 that can travel with the welding-type tool 112. The system 300 supports straight joints 120 of any slope, and can provide feedback with only a few minor calibration techniques, all of which are relatively fast, easy, and intuitive.

The present methods and/or systems may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type refers to actual live, and/or simulated, welding (including laser welding and/or hot wire welding), cladding (including laser cladding), brazing, plasma cutting, induction heating, carbon arc cutting or gouging, hot wire preheating, and/or resistive preheating.

As used herein, a welding-type tool refers to a tool suitable for and/or capable of actual live, and/or simulated, welding (including laser welding and/or hot wire welding), cladding (including laser cladding), brazing, plasma cutting, induction heating, carbon arc cutting or gouging, hot wire preheating, and/or resistive preheating.

As used herein, welding-type power refers to power suitable for actual live welding (including laser welding and/or hot wire welding), cladding (including laser cladding), brazing, plasma cutting, induction heating, carbon arc cutting or gouging, hot wire preheating, and/or resistive preheating.

As used herein, a welding-type power supply and/or welding-type power source refers to a device capable of, when input power is applied thereto, supplying output power suitable for actual live welding (including laser welding and/or hot wire welding), cladding (including laser cladding), brazing, plasma cutting, induction heating, carbon arc cutting or gouging, hot wire preheating, and/or resistive preheating; including but not limited to transformer-rectifiers, inverters, converters, resonant power supplies, quasi-resonant power supplies, switch-mode power supplies, etc., as well as control circuitry and other ancillary circuitry associated therewith.

As used herein, disable may mean deactivate, incapacitate, and/or make inoperative. As used herein, enable may mean activate and/or make operational.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

What is claimed is:

1. A method of monitoring welding technique, the method comprising:

determining, via processing circuitry, a first joint characteristic vector based on first sensor data detected during a first time period by a sensor system, the first sensor data being representative of a tool orientation of a welding-type tool during the first time period;

determining, via processing circuitry, a second joint characteristic vector based on second sensor data detected during a second time period by the sensor system, the second sensor data being representative of the tool orientation of the welding-type tool during the second time period;

tracking, during a third time period, via the processing circuitry, the tool orientation of the welding-type tool using third sensor data detected by the sensor system during a third time period; and identifying, via the processing circuitry, a welding technique parameter value based on the tool orientation of the welding-type tool during the third time period and the first and second joint characteristic vectors;

determining, via the processing circuitry, a slope of a workpiece or joint, or a travel direction, based on the first joint characteristic vector or the second joint characteristic vector; and providing feedback, via a user interface, based on the travel direction or the slope of the workpiece.

2. The method of claim 1, wherein the tool orientation of the welding-type tool corresponds to a tool orientation vector, the first or second sensor data comprising data representative of the tool orientation vector.

3. The method of claim 2, wherein:

the first joint characteristic vector or the second joint characteristic vector comprises a base plate perpendicular vector that is parallel to the tool orientation vector during the first time period or the second time period, respectively, or the first joint characteristic vector or the second joint characteristic vector comprises a joint orientation vector that is parallel to the tool orientation vector during the first time period or the second time period, respectively.

4. The method of claim 2, wherein: the first joint characteristic vector comprises a base plate perpendicular vector that is parallel to the tool orientation vector during the first time period, and the second joint characteristic vector comprises a joint orientation vector that is perpendicular to both the tool orientation vector during the second time period and the base plate perpendicular vector.

5. The method of claim 2, wherein the first joint characteristic vector comprises a joint orientation vector that is parallel to the tool orientation vector during the first time period, and the second joint characteristic vector comprises a base plate perpendicular vector that is perpendicular to both the tool orientation vector during the second time period and the joint orientation vector.

6. The method of claim 1, wherein the sensor system is attached to, or integrated with, the welding-type tool, the tool orientation of the welding-type tool corresponds to a tool orientation vector defined relative to a sensor reference frame of the sensor system, the first or second sensor data is representative of the tool orientation vector or the sensor reference frame, or the sensor system comprises an inertial measurement unit comprising an accelerometer, a gyroscope, or a magnetometer.

7. The method of claim 1, wherein the first and second time periods overlap, the third time period comprises a time period when a welding-type operation occurs, the welding technique parameter value comprises a work angle value or a travel angle value of the welding-type tool, or the method further comprises providing feedback, via the user interface, based on the welding technique parameter value.

8. A method of monitoring welding technique, the method comprising:

determining, via processing circuitry, a joint parallel plane, or joint perpendicular vector, based on first sensor data detected during a first time period by a sensor system;

determining, via processing circuitry, a first joint characteristic vector and a second joint characteristic vector based on the joint parallel plane, or the joint perpendicular vector, and second sensor data detected during a second time period by the sensor system;

tracking, during a third time period, via the processing circuitry, a tool orientation of a welding-type tool using third sensor data detected by the sensor system during a third time period; and identifying, via the processing circuitry, a welding technique parameter value based on the first and second joint characteristic vector and the tool orientation of the welding-type tool, wherein the sensor system is attached to, or integrated with, the welding-type tool, the tool orientation of the welding-type tool corresponds to a tool orientation vector defined relative to a sensor reference frame of the sensor system, the first or second sensor data is representative of the tool orientation vector or the sensor reference frame, or the sensor system comprises an inertial measurement unit comprising an accelerometer, a gyroscope, or a magnetometer.

9. The method of claim 8, wherein the first joint characteristic vector or the second joint characteristic vector is perpendicular to the joint perpendicular vector, or parallel to at least one vector that lies along the joint parallel plane.

10. The method of claim 8, wherein the tool orientation of the welding-type tool corresponds to a tool orientation vector, the first or second sensor data comprising data representative of the tool orientation vector.

11. The method of claim 10, wherein the second joint characteristic vector comprises a base plate perpendicular vector that is determined based on the tool orientation vector during the second time period, and the first joint characteristic vector comprises a joint orientation vector that is determined based on:

the base plate perpendicular vector and the joint perpendicular vector that is perpendicular to the joint plane, or the joint parallel plane and a base plate surface plane that is perpendicular to the base plate perpendicular vector.

12. The method of claim 11, further comprising:

identifying a slope of a joint that is parallel to the joint orientation vector, the slope being identified based on the joint orientation vector, or the base plate surface plane, and a gravity direction detected by the sensor system; and providing feedback, via a user interface, based on the slope of the workpiece.

13. The method of claim 8, wherein the first and second time periods overlap, or the third time period comprises a time period when a welding-type operation occurs.

14. The method of claim 8, wherein the welding technique parameter value comprises a work angle value or a travel angle value of the welding-type tool, or the method further comprises providing feedback, via a user interface, based on the welding technique parameter value.

15. A weld monitoring system, comprising:

a sensor system; and processing circuitry configured to:

determine a first joint characteristic vector based on first sensor data detected during a first time period by a sensor system, the first sensor data being representative of a tool orientation of a welding-type tool during the first time period, determine a second joint characteristic vector based on second sensor data detected during a second time period by the sensor system, the second sensor data being representative of the tool orientation of the welding-type tool during the second time period, track, during a third time period the tool orientation of the welding-type tool using third sensor data detected by the sensor system during a third time period; and identify a welding technique parameter value based on the tool orientation of the welding-type tool during the third time period and the first and second joint characteristic vectors, wherein the sensor system is attached to, or integrated with, the welding-type tool, the tool orientation of the welding-type tool corresponds to a tool orientation vector defined relative to a sensor reference frame of the sensor system, the first or second sensor data is representative of the tool orientation vector or the sensor reference frame, or the sensor system comprises an inertial measurement unit comprising an accelerometer, a gyroscope, or a magnetometer.

16. The system of claim 15, wherein the tool orientation of the welding-type tool corresponds to a tool orientation vector, the first or second sensor data comprising data representative of the tool orientation vector.

17. The system of claim 16, wherein:

the first joint characteristic vector or the second joint characteristic vector comprises a base plate perpendicular vector that is parallel to the tool orientation vector during the first time period or the second time period, respectively, or the first joint characteristic vector or the second joint characteristic vector comprises a joint orientation vector that is parallel to the tool orientation vector during the first time period or the second time period, respectively.

18. The system of claim 16, wherein:

the first joint characteristic vector comprises a base plate perpendicular vector that is parallel to the tool orientation vector during the first time period, and the second joint characteristic vector comprises a joint orientation vector that is perpendicular to both the tool orientation vector during the second time period and the base plate perpendicular vector.

19. The system of claim 16, wherein the first joint characteristic vector comprises a joint orientation vector that is parallel to the tool orientation vector during the first time period, and the second joint characteristic vector comprises a base plate perpendicular vector that is perpendicular to both the tool orientation vector during the second time period and the joint orientation vector.

20. The system of claim 15, further comprising a user interface configured to provide feedback based on the welding technique parameter value, the welding technique parameter value comprising a work angle value or a travel angle value of the welding-type tool, and the third time period comprising a time period when a welding-type operation occurs.

* * * * *